(12) United States Patent
Dudar

(10) Patent No.: US 10,301,991 B1
(45) Date of Patent: May 28, 2019

(54) SYSTEMS AND METHODS FOR ELECTRICALLY HEATED EXHAUST CATALYST DIAGNOSTICS

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/863,415

(22) Filed: Jan. 5, 2018

(51) Int. Cl.
| | |
|---|---|
| F01N 3/20 | (2006.01) |
| F02M 35/10 | (2006.01) |
| F02B 37/18 | (2006.01) |
| F02M 26/34 | (2016.01) |
| F02M 25/08 | (2006.01) |
| F02N 11/08 | (2006.01) |
| F02D 41/00 | (2006.01) |
| F01N 11/00 | (2006.01) |
| F01N 3/28 | (2006.01) |

(52) U.S. Cl.
CPC ......... *F01N 3/2013* (2013.01); *F01N 3/2828* (2013.01); *F01N 11/00* (2013.01); *F02B 37/183* (2013.01); *F02D 41/0065* (2013.01); *F02M 25/0872* (2013.01); *F02M 26/34* (2016.02); *F02M 35/1038* (2013.01); *F02N 11/0818* (2013.01); *F01N 2240/16* (2013.01); *F01N 2900/0602* (2013.01); *F02D 2200/0404* (2013.01)

(58) Field of Classification Search
CPC .... F01N 3/2013; F01N 3/2828; F01N 3/0222; F01N 11/00; F01N 2240/16; F01N 2900/0602; F02M 26/34; F02M 25/0872; F02M 35/1038; F02B 37/183; F02D 41/0065; F02D 2200/0404
USPC .......................... 60/274, 277, 286, 295, 299
See application file for complete search history.

(56) References Cited

U.S. PATENT DOCUMENTS

| | | | | |
|---|---|---|---|---|
| 2010/0269805 | A1* | 10/2010 | Fukuda | F02D 41/1454 123/690 |
| 2011/0277513 | A1* | 11/2011 | Oak | D06F 25/00 68/20 |

(Continued)

OTHER PUBLICATIONS

"The electrically heated catalyst EMICAT," Emitec Website, Available Online at http://www.emitec.com/en/technology/catalyst-substrates/emicat/, Available as Early as Jul. 2, 2015, 2 pages.

(Continued)

*Primary Examiner* — Audrey K Bradley
*Assistant Examiner* — Dapinder Singh
(74) *Attorney, Agent, or Firm* — Julia Voutyras; McCoy Russell LLP

(57) ABSTRACT

Methods and systems are provided for diagnosing an electric heater configured to increase a temperature of an exhaust catalyst positioned in an exhaust system of an engine. In one example, a method comprises diagnosing the electric heater by activating the electric heater, routing air flow from the exhaust system to an intake of the engine, and indicating the electric heater is degraded based on a test temperature in the intake being below a threshold temperature. In this way, the electric heater may be diagnosed without inclusion of costly sensors in the exhaust catalyst, and where such diagnosis conducted periodically may reduce release of undesired emissions to atmosphere.

20 Claims, 10 Drawing Sheets

(56) References Cited

U.S. PATENT DOCUMENTS

| | | | | |
|---|---|---|---|---|
| 2013/0133399 A1* | 5/2013 | Hibino | ............... | F02D 41/1494 |
| | | | | 73/23.31 |
| 2014/0114515 A1* | 4/2014 | Porras | ............... | B60H 1/00385 |
| | | | | 701/22 |
| 2015/0007553 A1* | 1/2015 | Omiya | ................. | F01N 3/2013 |
| | | | | 60/274 |

OTHER PUBLICATIONS

Dudar, A., "Systems and Methods for Diagnosing Components in a Vehicle Evaporative Emissions System," U.S. Appl. No. 15/248,817, filed Aug. 26, 2016, 67 pages.

Dudar, A., "Systems and Methods for Diagnosing a Vehicle Humidity Sensor," U.S. Appl. No. 15/660,015, filed Jul. 26, 2017, 66 pages.

Cade, M. et al., "A Boosted Engine System of a Motor Vehicle," U.S. Appl. No. 15/727,435, filed Oct. 6, 2017, 36 pages.

* cited by examiner

SYSTEMS AND METHODS FOR ELECTRICALLY HEATED EXHAUST CATALYST DIAGNOSTICS

FIELD

The present description relates generally to methods and systems for controlling a vehicle engine to diagnose whether an electric heater configured to heat an exhaust catalyst is functioning as expected or desired.

BACKGROUND/SUMMARY

Heated catalysts are used in motor vehicles to improve emission control by reducing hydrocarbon (HC) and carbon monoxide (CO) emissions. Such catalysts only work at fairly high temperatures. For example, when an engine is first started, the catalyst may not be effective in removing emissions in the exhaust until the catalyst reaches an operating temperature commonly referred to as its light-off temperature, or the point where conversion of CO or HC has reached 50% efficiency. Starting an engine with such a catalyst that needs to be warmed up to the light-off temperature, or cold-starting, may comprise a repetitive act particularly seen in hybrid vehicles that repeatedly start, stop, and restart the engine during normal operation.

Accordingly, one solution to engine cold-starting is to preheat the catalyst, to reduce an amount of time for the catalyst to reach its operating temperature. Such solutions may employ electric heating elements, whereby electrical energy supplied to the heating element raises the temperature of the catalyst quickly, thus improving its effectiveness as soon as possible after the engine starts.

Where such a heating element is included in hybrid vehicles, it is necessary to diagnose the heating element to ensure it is functioning as desired or expected. Such diagnostics may reduce or avoid undesired emissions being emitted to atmosphere. One example of such a diagnostic includes imbedding thermocouples within the catalyst, and monitoring for temperature gain when the heating element is activated. However, such a solution incurs additional cost, complexity, and additional diagnostics for the thermocouple itself. Accordingly, other diagnostics that utilize existing hardware present in engine systems are desired.

The inventors herein have recognized the above-mentioned issues, and have herein developed systems and methods to at least partially address them. In one example, a method comprises diagnosing an electric heater configured to increase a temperature of an exhaust catalyst positioned in an exhaust system of an engine of a vehicle by activating the electric heater, routing air flow from the exhaust system to an intake of the engine, and indicating the electric heater is degraded based on a test temperature in the intake being below a threshold temperature. In this way, the electric heater may be diagnosed without embedding thermocouples within the catalyst.

In one example, the method further comprises routing air flow from the exhaust system to the intake of the engine without activating the electric heater prior to activating the electric heater, to obtain a baseline temperature in the intake of the engine, and where the threshold temperature is a predetermined amount greater than the baseline temperature. In such an example, obtaining the baseline temperature and the test temperature is via an intake air temperature sensor.

In another example of the method, the method further comprises under conditions where the engine includes an electric booster positioned in the intake of the engine, routing air flow from the exhaust system to the intake via activating the electric booster in a reverse orientation to apply negative pressure with respect to atmospheric pressure on the exhaust system. Alternatively, under conditions where the engine does not include the electric booster, or where the electric booster is indicated to be degraded, the method may include routing air flow from the exhaust system to the intake via rotating the engine unfueled in reverse to apply negative pressure with respect to atmospheric pressure on the exhaust system. In either example, the method may include commanding fully open a throttle positioned in the intake in order to route air flow from the exhaust system to the intake of the engine.

In an example where routing air flow from the exhaust system to the intake via activating the electric booster in reverse, the method may further comprise commanding open an exhaust gas recirculation valve positioned in an exhaust gas recirculation passage, commanding open a wastegate valve positioned in a wastegate passage, the wastegate passage configured to bypass a turbine positioned in the exhaust system, and commanding closed an electric booster bypass valve configured in parallel with the electric booster and further configured to enable air flow to bypass the electric booster when the electric bypass valve is commanded open. In such an example, the method may further comprise sealing all cylinders of the engine via commanding closed intake and exhaust valves coupled to all cylinders of the engine.

In one example of the method, the vehicle may comprise a vehicle operated via a vehicle operator, or may comprise an autonomous vehicle. In either case, diagnosing the electric heater may include conditions where the vehicle is unoccupied, or in other words indicated to be unoccupied.

Furthermore, in an example of the method, the engine may be equipped with a start/stop feature that automatically stops the engine in response to a set of predetermined conditions being met while the engine is combusting air and fuel. In such an example, under conditions where the electric heater is indicated to be degraded, the method may include updating the start/stop feature to prevent the engine from stopping at start/stop events where it is predicted that the temperature of the exhaust catalyst will drop below a threshold exhaust catalyst temperature during the start/stop event. In this way, undesired emissions released to the environment may be effectively reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 7 is conducted.

DETAILED DESCRIPTION

Figure 5:
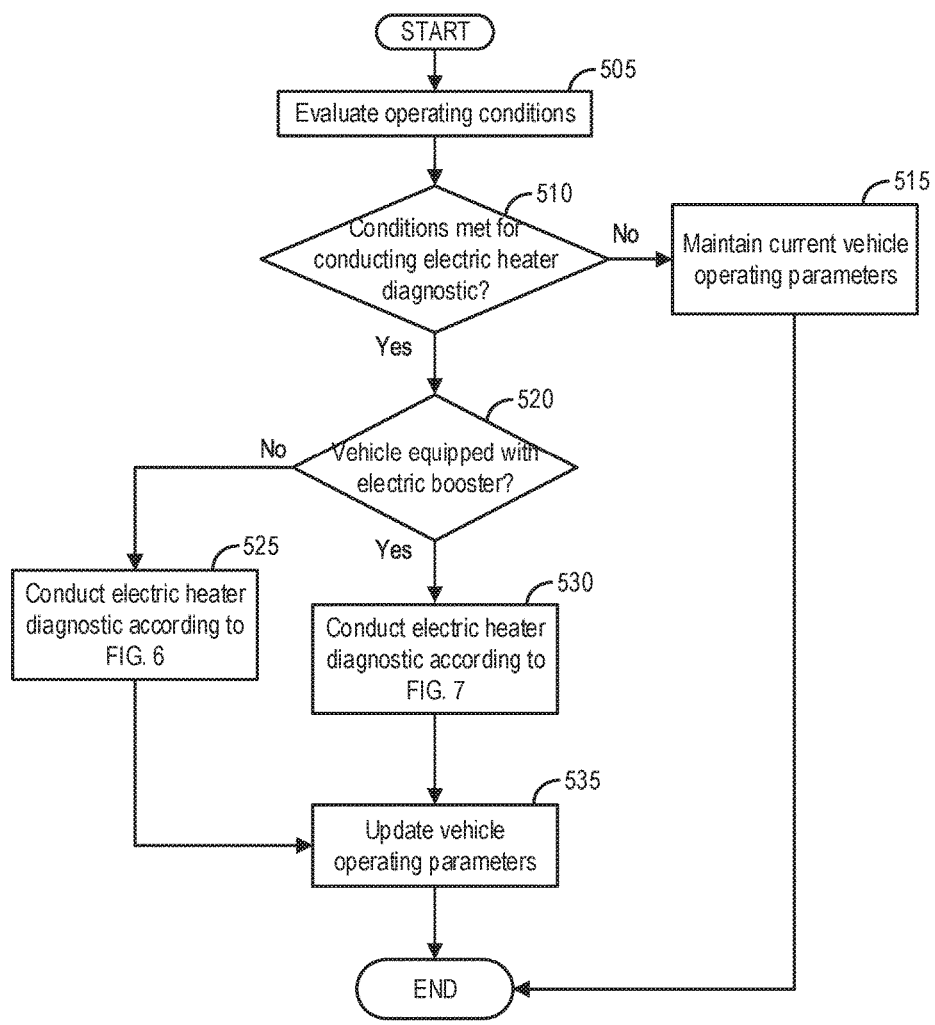
FIG. 5 illustrates a high-level example method for determining whether to conduct an electric heater diagnostic on an electric heater coupled to an exhaust catalyst, via rotating an engine in reverse, or via rotating an electric compressor in reverse.
Figure 6:
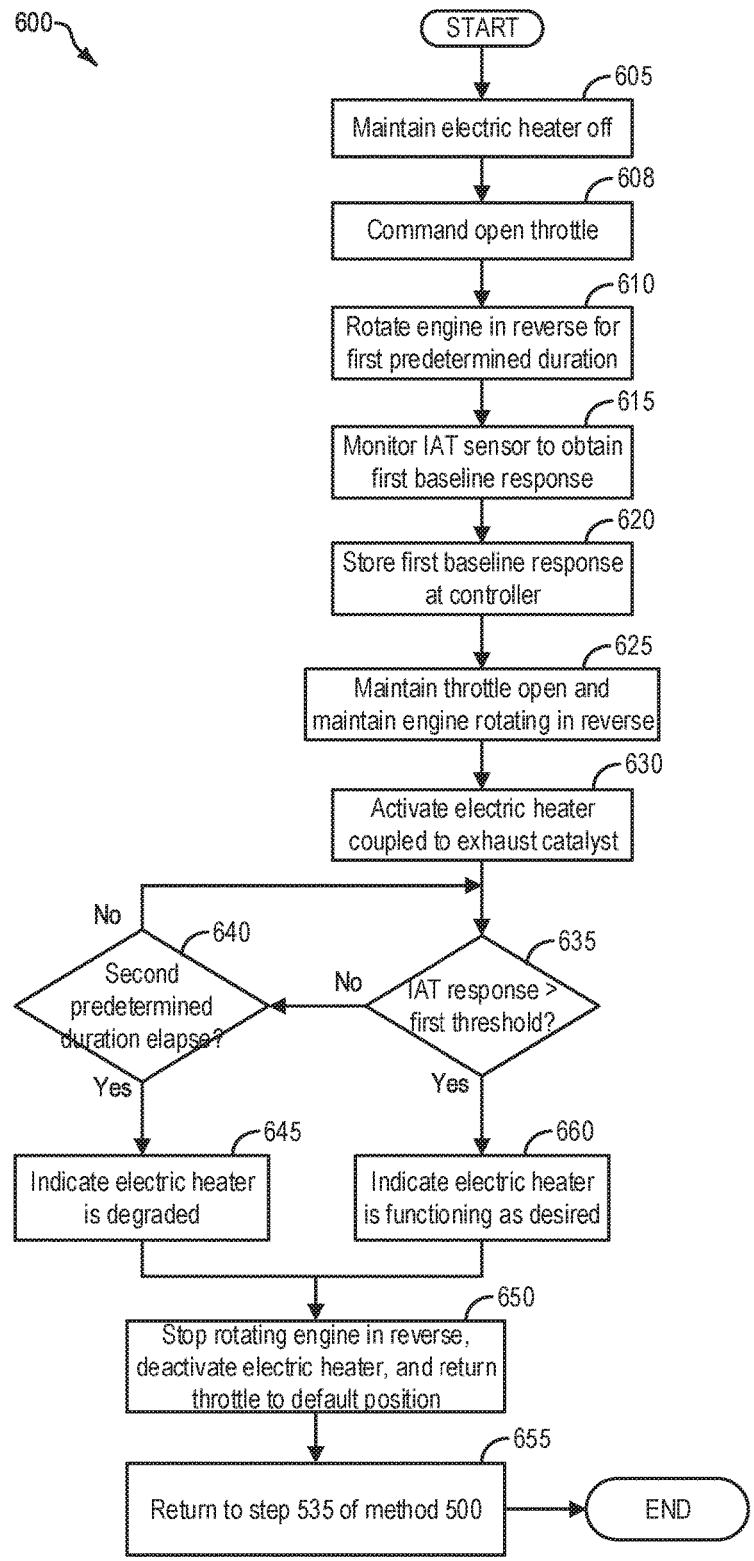
FIG. 6 depicts an example method for conducting the electric heater diagnostic via rotating the engine in reverse.
Figure 7:
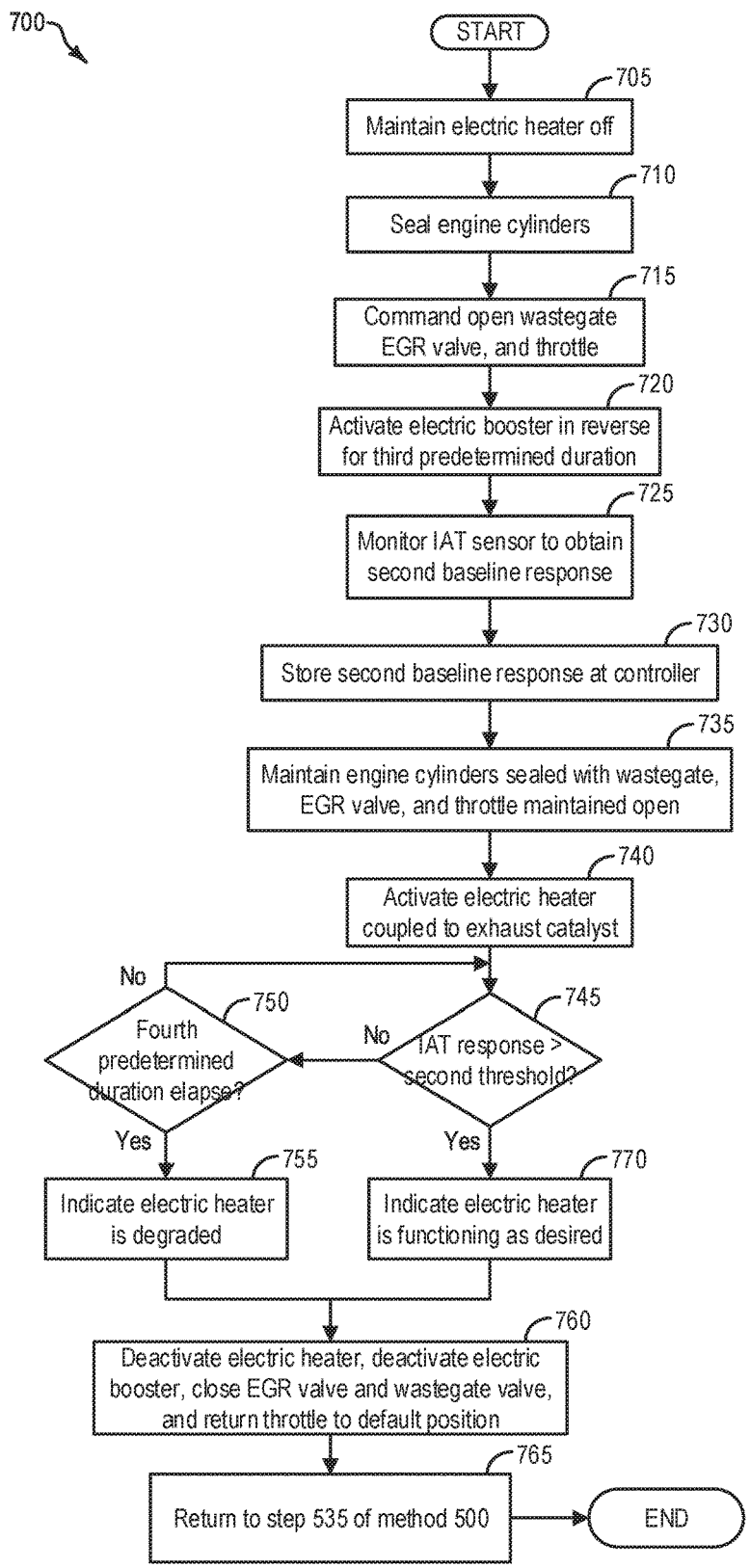
FIG. 7 depicts an example method for conducting the electric heater diagnostic via rotating the electric booster in reverse.
Figure 8:
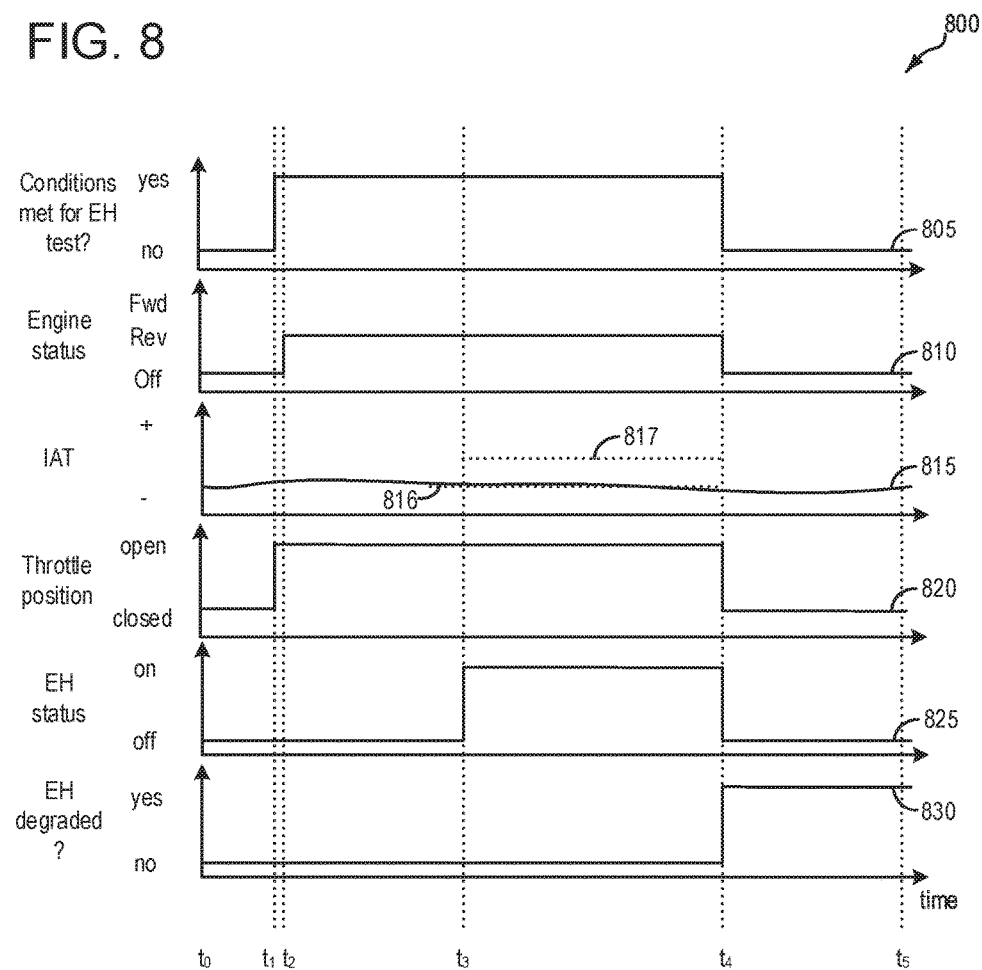
FIG. 8 depicts an example timeline illustrating how the electric heater diagnostic of FIGS. 5-6 is conducted.
Figure 9:
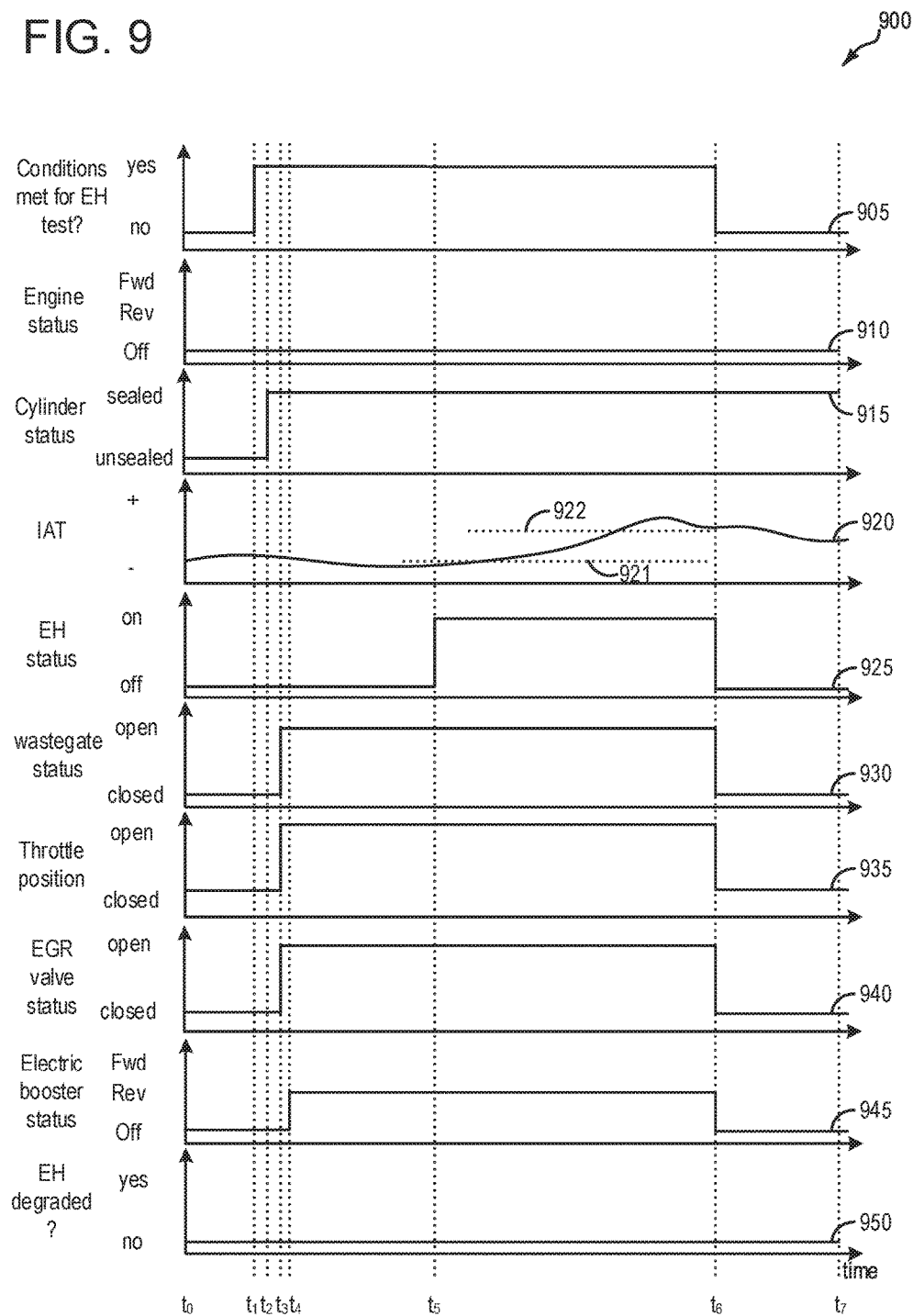
FIG. 9 depicts an example timeline illustrating how the electric heater diagnostic of FIG. 5
Figure 10:
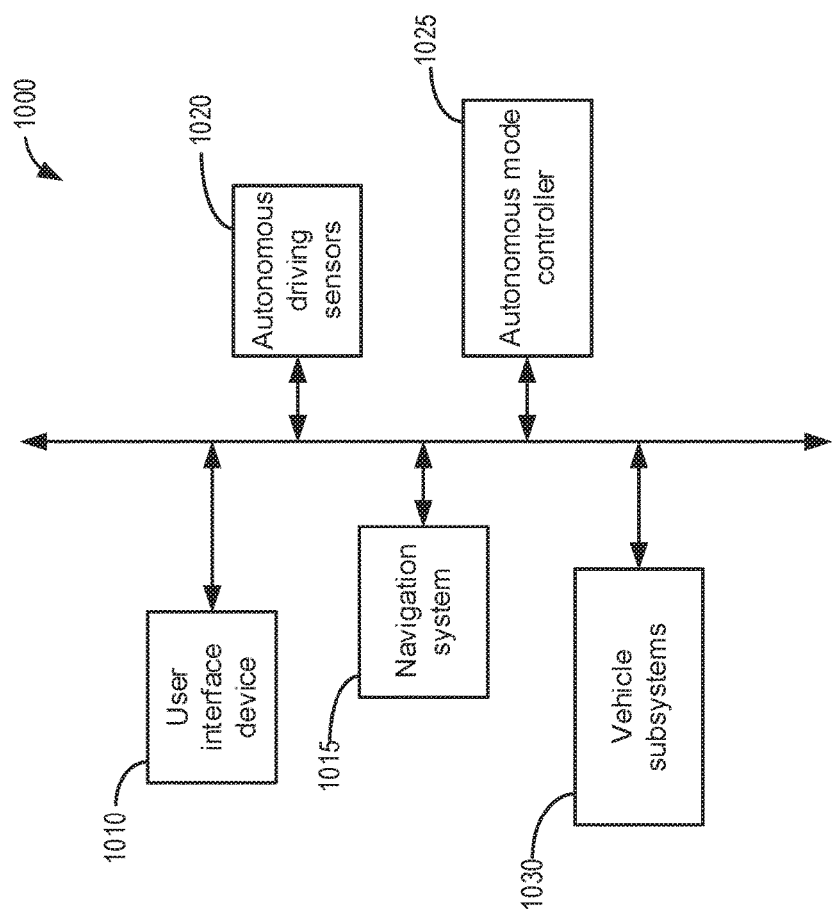
FIG. 10 schematically illustrates a block diagram of an example system for an autonomous vehicle.

The following description relates to systems and methods for diagnosing whether an electric heater coupled to an exhaust catalyst is functioning as desired or expected. Such a method may be useful in particular for hybrid electric vehicles, such as the hybrid electric vehicle propulsion system depicted at FIG. 1. In an example where such a vehicle propulsion system includes an engine, but not an electric booster, such as the engine system depicted at FIG. 2 (or in examples where the electric booster is degraded), an electric heater diagnostic may include rotating the engine in a reverse orientation with and without the electric heater activated, and monitoring a temperature in an intake of the engine, to determine whether the electric heater is functioning as desired. Alternatively, in a case where the vehicle propulsion system includes an electric booster, such as the engine system of FIG. 3, then the electric booster may be rotated in reverse with and without the electric heater activated, where temperature in the intake is similarly monitored to determine whether the electric heater is functioning as desired. Rotating the engine and/or the electric booster in a reverse direction or orientation may be enabled via the use of an H-bridge circuit, such as the H-bridge circuit depicted and described at FIGS. 4A-4B. FIG. 5 depicts a high-level example method for determining whether to conduct the electric heater diagnostic via the engine, or via the electric booster. FIG. 6 depicts an example method for conducting the electric heater diagnostic via the engine, and FIG. 7 depicts an example method for conducting the electric heater diagnostic via the electric booster. FIG. 8 depicts an example timeline for conducting the electric heater diagnostic via the engine, while FIG. 9 depicts an example timeline for conducting the electric heater diagnostic via the electric booster. In some examples, the systems and methods discussed herein may be applied to autonomous vehicles, and accordingly, a description of a system for autonomously controlling a vehicle is provided at FIG. 10.

Figure 1:
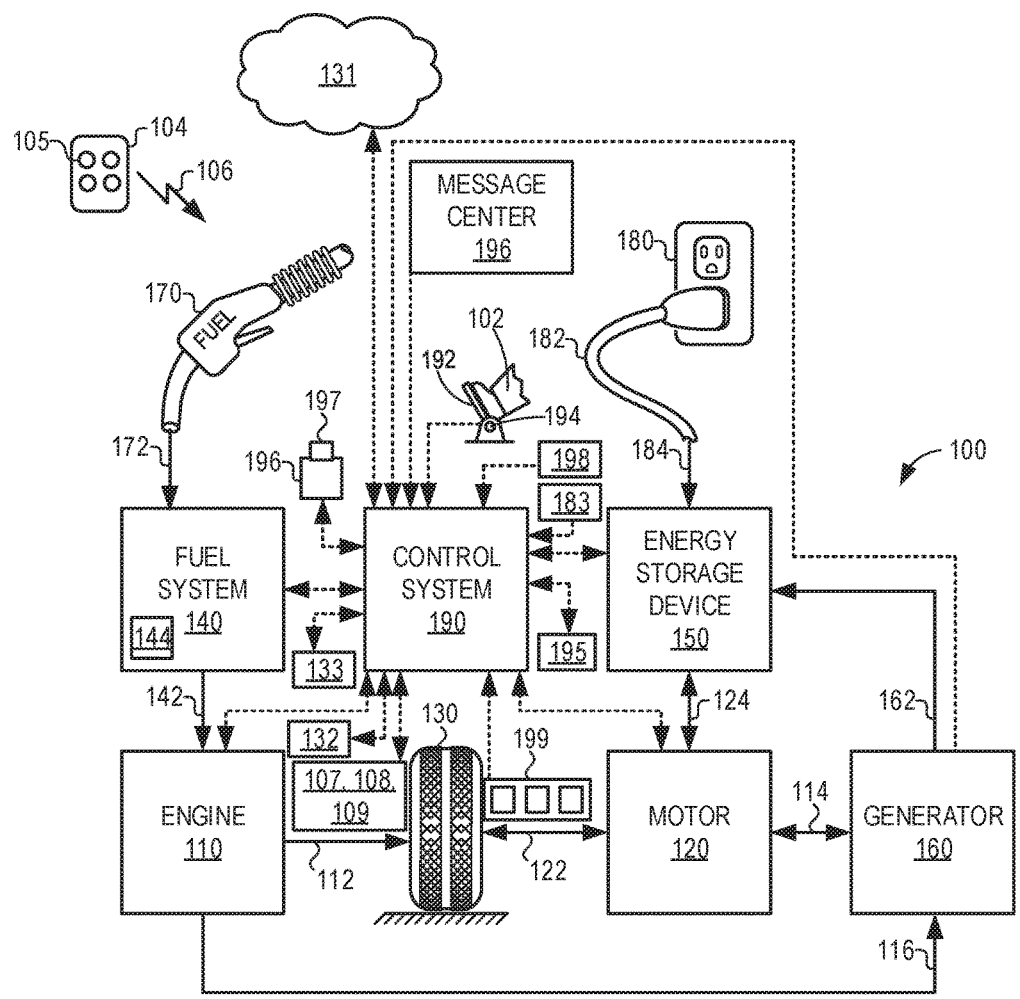
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162. In some examples, the motor 120 and generator 160 may comprise a same motor/generator.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In still other examples, which will be discussed in detail below, motor 120 may in some examples be utilized to spin or rotate the engine 110 in an unfueled configuration. More specifically, motor 120 may rotate the engine unfueled, using power from onboard energy storage device 150, which may include a battery, capacitor, super-capacitor, etc., for example. In a case where motor 120 is used to rotate the engine unfueled, fuel injection to engine cylinders may be prevented, and spark may not be provided to each of the engine cylinders. As will be discussed in further detail below, the engine may in some examples be spun or rotated unfueled, in a forward or default direction, whereas in other examples, the engine may be spun or rotated unfueled in a reverse direction. For example, an H-bridge circuit (see FIGS. 4A-4B) may be utilized to spin the engine in a forward or reverse direction. Still further, while not illustrated at FIG. 1 (but see FIG. 3), the vehicle propulsion system may in some examples include an electric booster, or electric compressor, which may similarly be controlled via the motor to rotate in either a forward or reverse orientation.

In some examples, engine 110 may be configured with a start/stop (S/S) feature 183 (also referred to herein as a S/S system) communicatively coupled to control system 190, wherein the control system 190 may automatically shut down (idle-stop) the internal combustion engine 110 without receiving operating input to shut down the engine, if selected idle-stop conditions, or in other words a set of predetermined conditions, are met. These may include, for example, torque demand being less than a threshold engine speed, vehicle speed below a threshold vehicle speed (e.g. 5 mph), the onboard energy storage device being sufficiently charged, no request being received for air-conditioning, etc. Likewise, the engine may be automatically restarted responsive to the torque demand being higher than the threshold, the battery (e.g. onboard energy storage device) requesting to be charged, an air-conditioning compressor requesting to be operated, etc. In one example, the engine may be restarted responsive to the operator applying the accelerator pedal after being stopped for a duration (e.g. at a traffic signal). The engine may be cranked unfueled via a motor (e.g. 120) or electric machine coupled to a crankshaft of the engine, until a desired engine speed is reached, after which the motor or electric machine may be disabled and engine fueling may be resumed. Thereafter engine combustion may be able to support engine spinning. As a result of the automatic start/stops, fuel consumption and exhaust emissions can be reduced.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, the fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, traffic information, etc. In one example, information received from the GPS may be utilized in conjunction with route learning methodology, such that routes commonly traveled by a vehicle may be learned by the vehicle control system 190. In some examples, other sensors 133, such as lasers, radar, sonar, acoustic sensors, etc., may be additionally or alternatively utilized in conjunction with the onboard navigation system to conduct route learning of commonly traveled routes by the vehicle. As one example, route-learning methodology may comprise information related to learned duration of stops along learned driving routines, where the engine may be stopped as a result of the S/S feature. In some examples, such learned duration of stops where the engine may be shut down may include information acquired wirelessly via the control system (via GPS and/or internet, V2V, V2I2V, etc.) where such information may include traffic light status (e.g. how long until a particular traffic light turns green), traffic conditions that relate to how long a particular stop may last, etc. As will be discussed in detail below, such information may be used in order to adjust or update the S/S system to avoid shutting down the engine in circumstances where it is predicted that an exhaust catalyst (see FIGS. 2-3) temperature will drop below a threshold temperature (e.g. light-off temperature) during the particular S/S event, and where an electric heater (see FIGS. 2-3) configured to heat the exhaust catalyst is indicated to be degraded. By avoiding shutting down the engine under such circumstances, undesired release of emissions to atmosphere may be reduced or avoided.

Vehicle system 100 may in some examples also include sensors dedicated to indicating the occupancy-state of the vehicle, for example seat load cells 107, door sensing technology 108, and onboard cameras 109.

Figure 2:
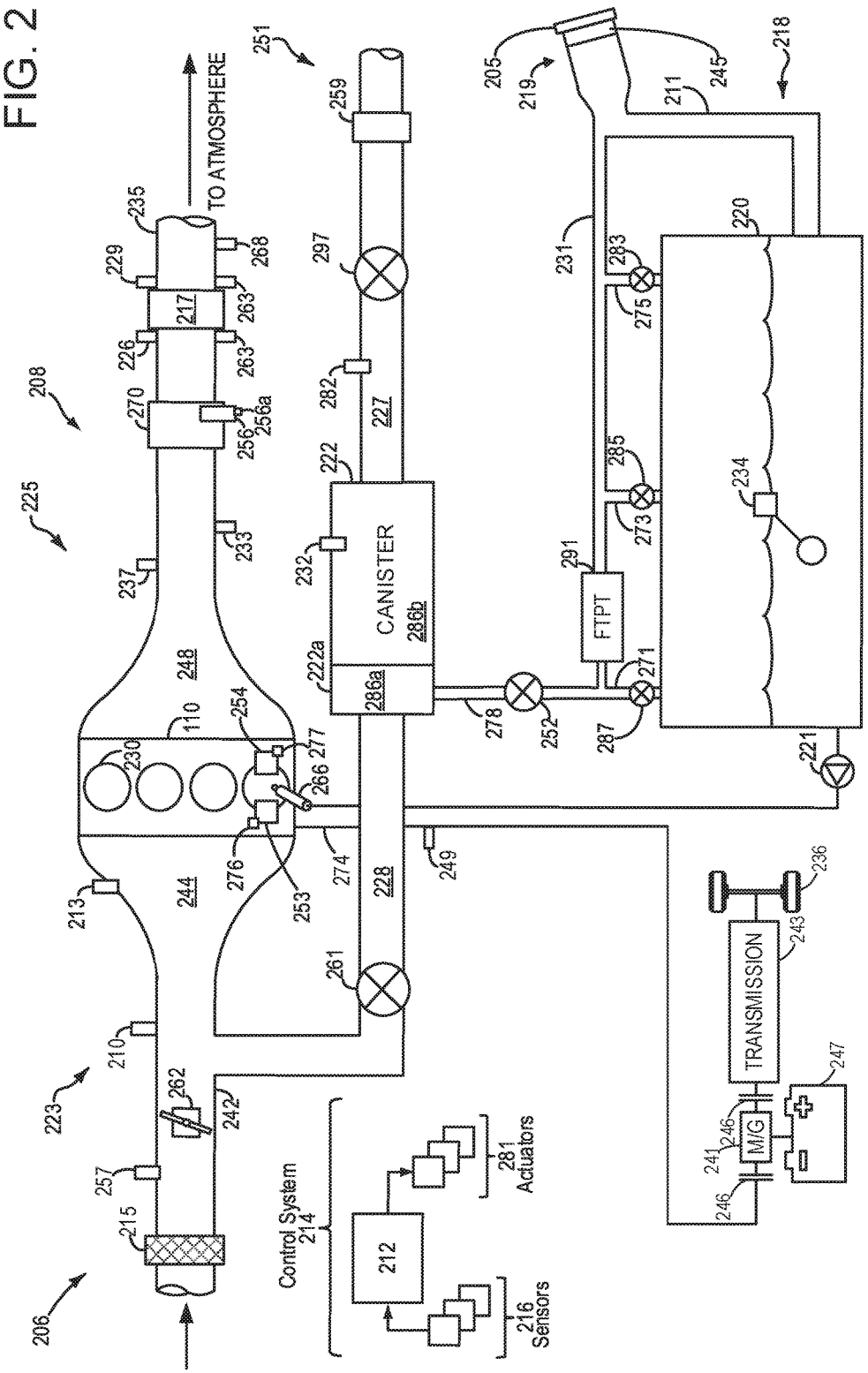
FIG. 2 schematically shows an example engine system with a fuel system and an evaporative emissions system.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system 251 and a fuel system 218. It may be understood that fuel system 218 may comprise the same fuel system as fuel system 140 depicted at FIG. 1. Emission control system 251 includes a fuel vapor container or canister 222 which may be used to capture and store fuel vapors. In some examples, vehicle system 206 may be a hybrid electric vehicle system.

The engine system 208 may include an engine 110 having a plurality of cylinders 230. While not explicitly shown, it may be understood that each cylinder may include one or more intake valve(s) and one or more exhaust valve(s). The engine 110 includes an engine air intake 223 and an engine exhaust system 225. The engine air intake 223 includes a throttle 262 in fluidic communication with engine intake manifold 244 via an intake passage 242. The throttle 262 may comprise an electronic throttle, which may be controlled via the vehicle controller sending a signal to actuate the throttle to a desired position. In such an example where the throttle is electronic, power to control the throttle to the desired position may be from an onboard energy storage device (e.g. 150), such as a battery. Further, engine air intake 223 may include an air box and filter 215 positioned upstream of throttle 262. The engine exhaust system 225 includes an exhaust manifold 248 leading to an exhaust passage 235 that routes exhaust gas to the atmosphere. The engine exhaust system 225 may include one or more emission control devices, or exhaust catalyst 270, which may be mounted in a close-coupled position in the exhaust. The one or more emission control devices may include a three-way catalyst, lean NOx trap, diesel particulate filter, oxidation catalyst, etc. In some examples, the one or more emission control devices may include an electric heater 256, the electric heater 256 configured to raise a temperature of the emission control device to a desired operating temperature (e.g. light-off temperature). The electric heater may be under control of controller 212, which may send a signal to an electric heater actuator 256*a*, thus actuating the electric heater on, or off.

It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP. Alternatively, MAP may be inferred from alternate engine operating conditions, such as mass air flow (MAF), as measured by MAF sensor 210 coupled to the intake manifold.

Engine exhaust system 225 may further include a gasoline particulate filter (GPF) 217. GPF 217 may comprise a particulate filter, hydrocarbon trap, a catalyzed wash coat, or combination thereof. In some examples, during operation of engine 110, GPF 217 may be periodically regenerated by operating at least one cylinder of the engine within a particular air-fuel ratio to increase a temperature of GPF 217, such that retained hydrocarbons and soot particles may be oxidized. While a GPF is illustrated at FIG. 2, it may be understood that in other examples, a diesel particulate filter may instead be included in the vehicle propulsion system.

In some examples, temperature sensor 226 may be positioned upstream from the inlet of GPF 217 and temperature sensor 229 may be positioned downstream of GPF 217. Temperature sensors 226 and 229 may be used to assess the temperature of GPF 217 for regeneration purposes, for example. Furthermore, pressure in the exhaust system may be assessed by pressure sensor 263. Pressure sensor 263 may be a differential pressure sensor positioned upstream and downstream of GPF 217, for example. Pressure sensor 263 may be used to determine pressure at the inlet of GPF 217 in order to assess operating conditions for air to be introduced to the inlet of GPF 217 for regeneration. Furthermore, in some examples, soot sensor 268 may be positioned downstream of GPF 217, to assess the level of soot that is released from GPF 217. Soot sensor 268 may be used to diagnose operation of GPF 217, among other functions.

Fuel system 218 may include a fuel tank 220 coupled to a fuel pump system 221. It may be understood that fuel tank 220 may comprise the same fuel tank as fuel tank 144 depicted above at FIG. 1. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request (e.g., a vehicle operator initiated request), the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation, provided the fuel tank is coupled to the canister under such conditions). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261. As will be discussed in detail below, in some examples the FTIV may not be included, whereas in other examples, an FTIV may be included.

Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. As discussed, in some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, pressure sensor 282, canister temperature sensor 232, MAF sensor 210, intake air temperature (IAT) sensor 257 and pressure sensor 263. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297, electric heater actuator 256a, etc. The controller may receive input data from the various sensors, process the input data, and trigger the actuators in response to the processed input data based on instruction or code programmed therein corresponding to one or more routines. Example control routines are described herein with regard to FIGS. 5-7.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode, or a remote start event may trigger a return to an awake mode. In some examples, a wakeup capability may enable a circuit to wake the controller in order to conduct diagnostics on the engine system, as will be discussed in further detail below.

Undesired evaporative emissions detection routines may be intermittently performed by controller 212 on fuel system 218 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced.

Intake manifold 244 is coupled to combustion chambers or cylinders 230 through a series of intake valves 253. The combustion chambers are further coupled to exhaust manifold 248 via a series of exhaust valves 254. While only one intake and one exhaust valve is depicted at FIG. 2, it may be understood that each combustion chamber or cylinder may include an intake and exhaust valve. In the depicted embodiment, a single exhaust manifold 248 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance. While in this example illustration, a camshaft is not illustrated, one or more camshaft sensors (not shown) may be included in the vehicle propulsion system. Furthermore, crankshaft 274 may include crankshaft sensor 249. In some examples, one or both of crankshaft sensor 249 and/or camshaft sensors (not shown) may be utilized to infer a position of one or more pistons coupled to the engine cylinders 230.

In some examples, engine 110 may comprise a variable displacement engine (VDE) where each cylinder of engine 110 may be selectively deactivated, where deactivatable refers to the ability of the controller 212 to command both intake and exhaust valves closed for particular cylinder(s), thus sealing the particular cylinders. If fuel injection is also stopped, then such action may result in the particular cylinder(s) being essentially an air-spring if the engine is rotating. Accordingly, as depicted herein, in one embodiment, deactivation of intake valve 253 may be controlled by first VDE actuator 276 while deactivation of exhaust valve 254 may be controlled by second VDE actuator 277. In alternate embodiments, a single VDE actuator may control deactivation of both intake and exhaust valves of a deactivatable cylinder. In still other embodiments, a single cylinder valve actuator may deactivates a plurality of cylinders (both intake and exhaust valves), for example all the cylinders in a deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators. It may be further understood that, while the engine 110 is depicted as a VDE engine, the engine may in other examples not be a VDE engine without departing from the scope of this disclosure.

In some examples, vehicle system 206 may be a hybrid vehicle with multiple sources of torque available to one or more vehicle wheels 236 (e.g. 130). In the example shown, vehicle system 206 includes engine 110 and an electric machine 241. Electric machine 241 may be a motor (e.g. 120) or a motor/generator. Crankshaft 274 of engine 110 and electric machine 241 are connected via a transmission 243 to vehicle wheels 236 when one or more clutches 246 are engaged. In the depicted example, a first clutch is provided between crankshaft 274 and electric machine 241, and a second clutch is provided between electric machine 241 and transmission 243. Controller 212 may send a signal to an actuator (not shown) of each clutch 246 to engage or disengage the clutch, so as to connect or disconnect crankshaft from electric machine 241 and the components connected thereto, and/or connect or disconnect electric machine 241 from transmission 243 and the components connected thereto. Transmission 243 may be a gearbox, a planetary gear system, or another type of transmission. The powertrain may be configured in various manners including as a parallel, a series, or a series-parallel hybrid vehicle.

Electric machine 241 receives electrical power from a traction battery 247 (e.g. 150) to provide torque to vehicle wheels 130. Electric machine 241 may also be operated as a generator to provide electrical power to charge traction battery 247, for example during a braking operation.

Figure 3:
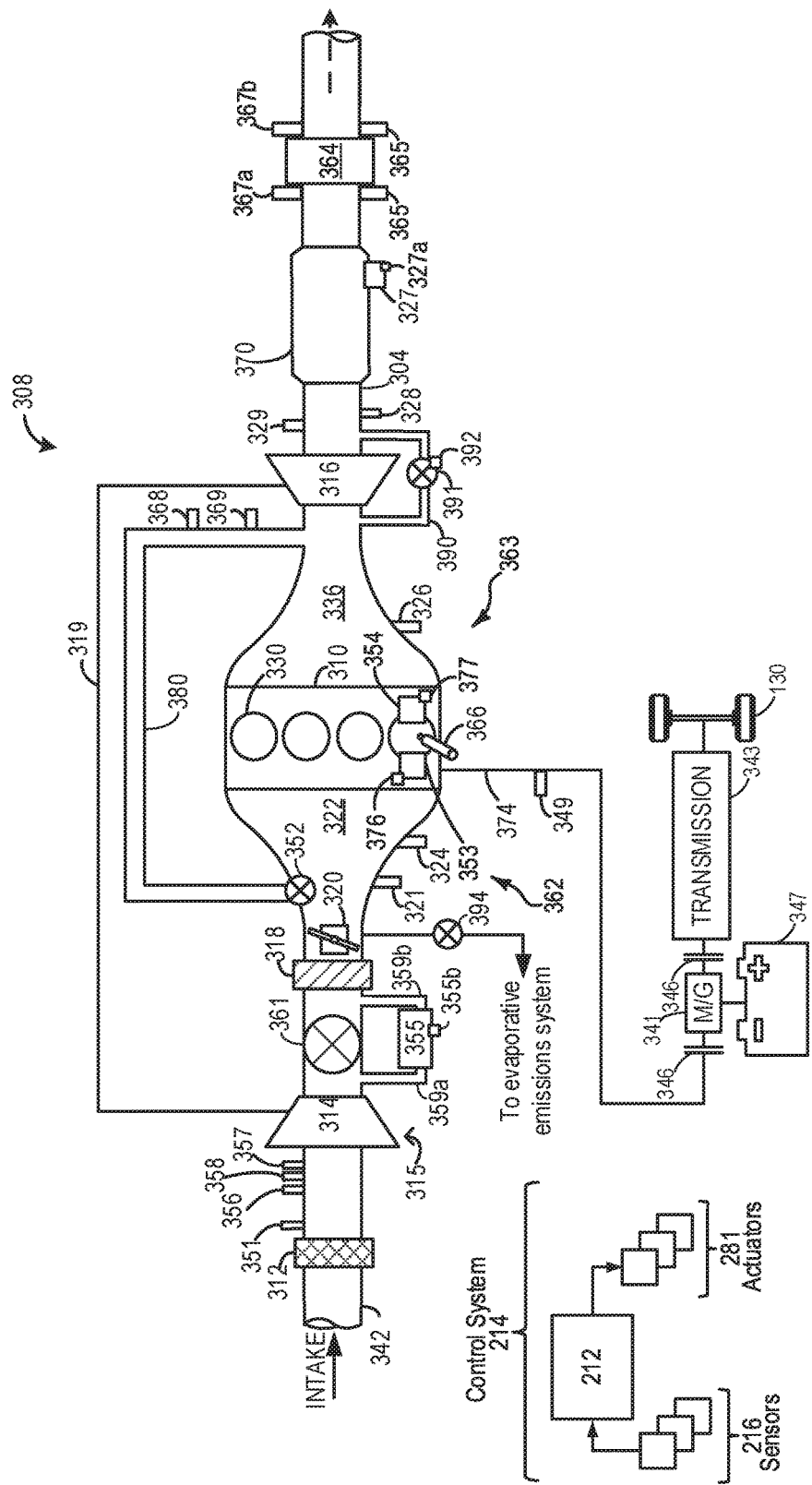
FIG. 3 schematically shows another example of an engine system including an electric booster.

Turning now to FIG. 3, it shows another example engine system 308. Engine system 308 may be included in vehicle propulsion system 206 (e.g. 100) without departing from the scope of this disclosure. It may be understood that many of the components of engine system 308 may also be included in engine system 206. The engine 310 (e.g. 110) includes an engine air intake system 362 (e.g. 223) and an engine exhaust system 363 (e.g. 225). In one example, the engine system 308 may be a diesel engine system. In another example, the engine system 308 may be a gasoline engine system. In the depicted embodiment, engine 310 is a boosted engine coupled to a turbocharger 315 including a compressor 314 driven by a turbine 316. Specifically, fresh air is introduced along intake passage 342 (e.g. 242) into engine 310 via air cleaner 312 (e.g. 215) and flows to compressor 314. The compressor may be any suitable intake-air compressor, such as a motor-driven or driveshaft driven supercharger compressor. In engine system 310, the compressor is a turbocharger compressor mechanically coupled to turbine 316 via a shaft 319, the turbine 316 driven by expanding engine exhaust.

As shown in FIG. 3, compressor 314 is coupled through charge-air cooler (CAC) 318 to throttle valve 320 (e.g. 262). Throttle valve 320 is coupled to engine intake manifold 322 (e.g. 244). From the compressor, the compressed air charge flows through the charge-air cooler 318 and the throttle valve 320 to the intake manifold 322. In the embodiment shown in FIG. 3, the pressure of the air charge within the intake manifold 322 is sensed by manifold air pressure (MAP) sensor 324 (e.g. 213). In some examples, air flow in the intake manifold may be sensed via a mass air flow (MAF) sensor 321 (e.g. 210). Temperature of ambient air entering the intake passage 342 may be estimated via an intake air temperature (IAT) sensor 351 (e.g. 257).

One or more sensors may be coupled to an inlet of compressor 314. For example, a temperature sensor 358 may be coupled to the inlet for estimating a compressor inlet temperature, and a pressure sensor 356 may be coupled to the inlet for estimating a compressor inlet pressure. As another example, an ambient humidity sensor 357 may be coupled to the inlet for estimating a humidity of aircharge entering the intake manifold. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 392 may be actuated to open wastegate 391 to dump at least some exhaust pressure from upstream of the turbine to a location downstream of the turbine via wastegate 391. By reducing exhaust pressure upstream of the turbine, turbine speed can be reduced, which in turn helps to reduce compressor surge. Wastegate 391 may be positioned in a wastegate passage 390. The methodology discussed herein utilizes a wastegate that is actuatable open and closed, however, it is herein recognized that in some examples, a spring-loaded wastegate may be included in the vehicle system.

To assist the turbocharger 315, an additional electric intake air compressor, herein also referred to as an electric compressor or electric booster 355 may be incorporated into the vehicle propulsion system. Electric booster 355 may be powered via an onboard energy storage device (e.g. 150), which may comprise a battery, capacitor, supercapacitor, etc. The electric booster may include a compressor driven by an electric motor. A speed of operation of the electric booster may include adjusting a speed of operation of the electric motor, the electric motor operated via the on-board energy storage device (e.g. 150).

In one example, electric booster 355 may be actuated in response to a demand for increased wheel torque, in order to provide the desired boost air rapidly to the engine while the turbocharger turbine spools up. As a result, the increased torque can be met without incurring the turbo lag which may otherwise have occurred if the assist from the electric booster was not available. In such an example, responsive to the turbocharger spooling up to a threshold speed (e.g. 70,000 rpm), the electric booster 355 may be actuated off, or deactivated. More specifically, operational control of the electric booster 355 may be achieved based on command signals (e.g. duty cycle or pulse width signals) received from the vehicle controller (e.g. controller 212). For example, the controller may send a signal to an electric booster actuator 355*b*, which may actuate on the electric booster. In another example, the controller may send a signal to the electric booster actuator 355*b*, which may actuate off the electric booster. In one example the electric booster actuator may comprise an electric motor which drives the compression of air. In some examples, as will be discussed in detail below, the electric compressor may be rotated in a reverse direction. Reversing operation of the electric booster 355 may be achieved at least in part via an H-bridge circuit (see FIGS. 4A-4B).

Electric booster 355 may be positioned between a first electric booster conduit 359*a*, and a second electric booster conduit 359*b*. First electric booster conduit 359*a* may fluidically couple intake passage 342 to electric booster 355 upstream of electric booster bypass valve 361. Second electric booster conduit 159*b* may fluidically couple electric booster 155 to intake passage 342 downstream of electric booster bypass valve 361. As an example, air may be drawn into electric booster 355 via first electric booster conduit 359*a* upstream of electric booster bypass valve 361, and compressed air may exit electric booster 355 and be routed via second electric booster conduit to intake passage 342 downstream of electric booster bypass valve 361. In this way, compressed air may be routed to engine intake manifold 322. It may be understood that the above description relates to when the electric compressor is rotated in a forward direction. The electric compressor may in some examples be rotated in a reverse direction, which may thus result in compressed air being routed in the opposite direction, in other words, from the intake manifold (and in some examples the exhaust system) to atmosphere via intake passage 342.

In circumstances where the electric booster 355 is activated to provide boost more rapidly than if the turbocharger 315 were solely relied upon, it may be understood that electric booster bypass valve 361 may be commanded closed while electric booster 355 is activated. In this way, intake air may flow through turbocharger 315 and through electric booster 355. Once the turbocharger reaches the threshold speed, the electric booster 355 may be turned off, and the electric booster bypass valve 361 may be commanded open.

Intake manifold 322 is coupled to a series of combustion chambers 330 (e.g. 230) through a series of intake valves 353 (e.g. 253). The combustion chambers are further coupled to exhaust manifold 336 (e.g. 248) via a series of exhaust valves 354 (e.g. 254). In the depicted embodiment, a single exhaust manifold 336 is shown. However, in other embodiments, the exhaust manifold may include a plurality of exhaust manifold sections. Configurations having a plurality of exhaust manifold sections may enable effluent from different combustion chambers to be directed to different locations in the engine system.

As discussed above, in one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance. While in this example illustration, a camshaft is not illustrated, one or more camshaft sensors (not shown) may be included in the vehicle propulsion system. Furthermore, it may be understood that vehicle system 308 may include a crankshaft 374 (e.g. 274) and may include a crankshaft sensor (e.g. 349). In some examples, one or both of the crankshaft sensor and/or camshaft sensors may be utilized to infer a position of one or more pistons coupled to the engine cylinders 330 (e.g. 230).

In some examples, engine 310 may comprise a variable displacement engine (VDE) where each cylinder of engine 310 may be selectively deactivatable, where deactivatable refers to the ability of the controller 212 to command both intake and exhaust valves closed for particular cylinder(s), thus sealing the particular cylinders. If fuel injection is also stopped, then such action may result in the particular cylinder(s) being essentially an air-spring if the engine is rotating. Accordingly, as depicted herein, in one embodiment, deactivation of intake valve 353 may be controlled by first VDE actuator 376 (e.g. 276) while deactivation of exhaust valve 354 may be controlled by second VDE actuator 377. In alternate embodiments, a single VDE actuator may control deactivation of both intake and exhaust valves of a deactivatable cylinder. In still other embodiments, a single cylinder valve actuator may deactivate a plurality of cylinders (both intake and exhaust valves), for example all the cylinders in a deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators.

Combustion chambers 330 may be supplied with one or more fuels, such as gasoline, alcohol fuel blends, diesel, biodiesel, compressed natural gas, etc., via injector 366 (e.g. 266). Fuel may be supplied to the combustion chambers via direct injection, port injection, throttle valve-body injection, or any combination thereof. In the combustion chambers, combustion may be initiated via spark ignition and/or compression ignition.

As shown in FIG. 3, exhaust from the one or more exhaust manifold sections may be directed to turbine 316 to drive the turbine. The combined flow from the turbine and the wastegate then flows through emission control device 370 (e.g. 270). In one example, the emission control device 370 may be a light-off catalyst. In general, the exhaust after-treatment device 370 is configured to catalytically treat the exhaust flow, and thereby reduce an amount of one or more substances in the exhaust flow. For example, the exhaust after-treatment device 370 may be configured to trap $NO_x$ from the exhaust flow when the exhaust flow is lean, and to reduce the trapped $NO_x$ when the exhaust flow is rich. In other examples, the exhaust after-treatment device 370 may be configured to disproportionate $NO_x$ or to selectively reduce $NO_x$ with the aid of a reducing agent. In still other examples, the exhaust after-treatment device 370 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow. In some examples, the one or more emission control devices may include an electric heater 327 (e.g. 256), the electric heater 327 configured to raise a temperature of the emission control device to a desired operating temperature (e.g. light-off temperature). The electric heater may be under control of controller 212, which may send a signal to an electric heater actuator 327a, thus actuating the electric heater on, or off.

Engine exhaust system 363 may further include a gasoline particulate filter (GPF) 364 (e.g. 217). GPF 364 may comprise a particulate filter, hydrocarbon trap, a catalyzed wash coat, or combination thereof. In some examples, during operation of engine 310, GPF 364 may be periodically regenerated by operating at least one cylinder of the engine within a particular air-fuel ratio to increase a temperature of GPF 364, such that retained hydrocarbons and soot particles may be oxidized.

In some examples, temperature sensor 367a (e.g. 226) may be positioned upstream from the inlet of GPF 364 and temperature sensor 367b (e.g. 229) may be positioned downstream of GPF 364. Temperature sensors 367a and 367b may be used to assess the temperature of GPF 364 for regeneration purposes, for example. Furthermore, pressure in the exhaust system may be assessed by pressure sensor 365 (e.g. 263). Pressure sensor 365 may be a differential pressure sensor positioned upstream (closer to exhaust manifold) and downstream (farther from exhaust manifold) of GPF 364, for example. Pressure sensor 365 may be used to determine pressure at the inlet of GPF 364 in order to assess operating conditions for air to be introduced to the inlet of GPF 364 for regeneration. Furthermore, in some examples, a soot sensor may be positioned downstream of GPF 364, to assess the level of soot that is released from GPF 364.

Exhaust gas recirculation (EGR) delivery passage 380 may be coupled to the exhaust passage 304 (e.g. 235) upstream of turbine 316 to provide high pressure EGR (HP-EGR) to the engine intake manifold, downstream of compressor 314. An EGR valve 352 may be coupled to the EGR passage 380 at the junction of the EGR passage 380 and the intake passage 342. EGR valve 352 may be opened to admit a controlled amount of exhaust to the compressor outlet for desirable combustion and emissions control performance. EGR valve 352 may be configured as a continuously variable valve or as an on/off valve. In further embodiments, the engine system may additionally or alternatively include a low pressure EGR (LP-EGR) flow path wherein exhaust gas is drawn from downstream of turbine 316 and recirculated to the engine intake manifold, upstream of compressor 314.

One or more sensors may be coupled to EGR passage 380 for providing details regarding the composition and condition of the EGR. For example, a temperature sensor 368 may be provided for determining a temperature of the EGR, a pressure sensor 369 may be provided for determining a pressure of the EGR, a humidity sensor (not shown) may be provided for determining a humidity or water content of the EGR, and an air-fuel ratio sensor (not shown) may be provided for estimating an air-fuel ratio of the EGR. Alternatively, EGR conditions may be inferred by the one or more temperature, pressure, humidity, and air-fuel ratio sensors coupled to the compressor inlet.

A plurality of sensors, including an exhaust temperature sensor 328 (e.g. 233), an exhaust gas sensor 326 (e.g. 237), and an exhaust pressure sensor 329 may be coupled to the main exhaust passage 304. The exhaust gas sensor may be linear oxygen sensors or UEGO (universal or wide-range exhaust gas oxygen), two-state oxygen sensors or EGO, HEGO (heated EGO), a NOx, HC, or CO sensors.

Engine system 308 may further include control system 214, as discussed above. Control system 214 is shown receiving information from a plurality of sensors 216 (various examples of which are described herein) and sending control signals to a plurality of actuators 218 (various examples of which are described herein). As one example, sensors 216 may include exhaust gas sensor 326 located upstream of the turbine 316, MAP sensor 324, exhaust temperature sensor 328, exhaust pressure sensor 329, compressor inlet temperature sensor 358, compressor inlet pressure sensor 356, ambient humidity sensor 357, IAT sensor 351, engine coolant temperature sensor, etc. Other sensors such as additional pressure, temperature, air/fuel ratio, and composition sensors may be coupled to various locations in engine system 308.

The actuators 281 may include, for example, electric booster bypass valve 361, throttle 320, electric booster actuator 355b, EGR valve 352, wastegate actuator 392, and fuel injector 366. The control system 214 may include a controller 212. The controller 212 may receive input data from the various sensors, process the input data, and trigger various actuators in response to the processed input data based on instruction or code programmed therein corresponding to one or more routines.

Furthermore, similar to engine system 208, engine system 308 may be a hybrid vehicle with multiple sources of torque available to one or more vehicle wheels 130. For example, vehicle system 308 may include electric machine 341, also referred to as a motor or motor/generator. Crankshaft 374 (e.g. 274) may couple the engine 310 and the electric machine to wheels 331 (e.g. 130) via transmission 343 (e.g. 243) when one or more clutches 346 (e.g. 246) are engaged. Electric machine 341 (e.g. 241 or 120) may receive electrical power from traction battery 347 (e.g. 247 or 150), as discussed above. Crankshaft 374 may include a crankshaft sensor 349 (e.g. 249).

Still further, engine system 308 may be coupled to an evaporative emissions system (not shown at FIG. 3 but see 251 of FIG. 2) via a canister purge valve (CPV) 394 (e.g. 261). While the details of the evaporative emissions system and fuel system are not illustrated at FIG. 3, it may be understood that components of such systems are the same as that depicted above at FIG. 2.

Figure 4A:
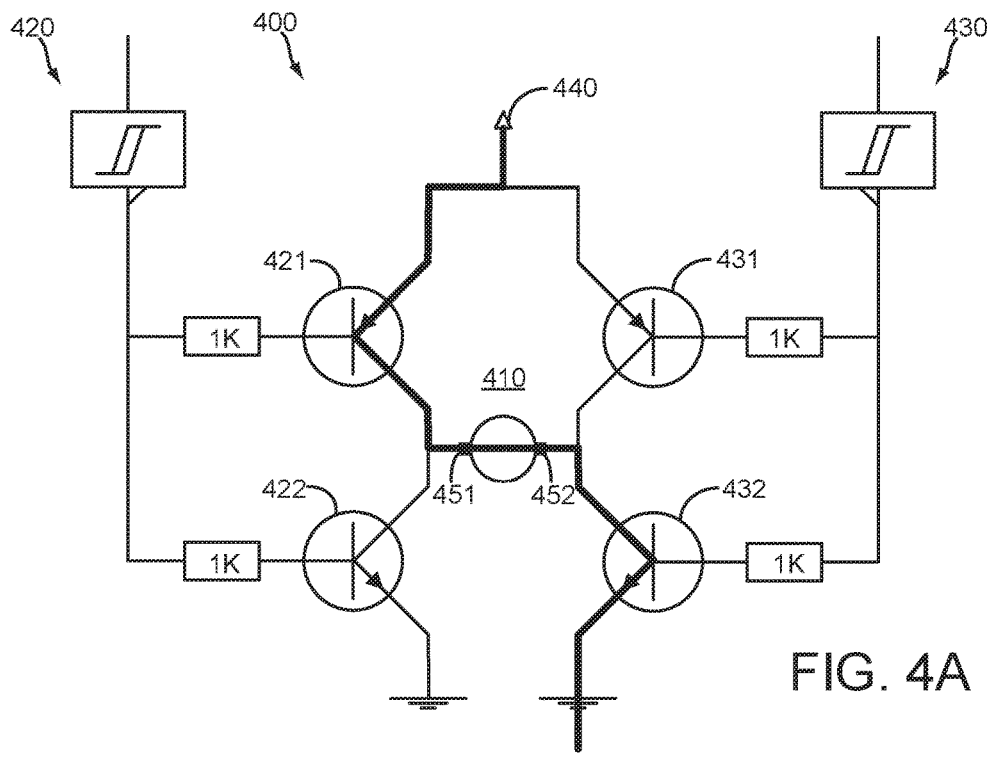
FIGS. 4A-4B depict example H-bridge circuitry which may be used to rotate a vehicle engine, or an electric compressor, in a forward or reverse direction.
Figure 4B:
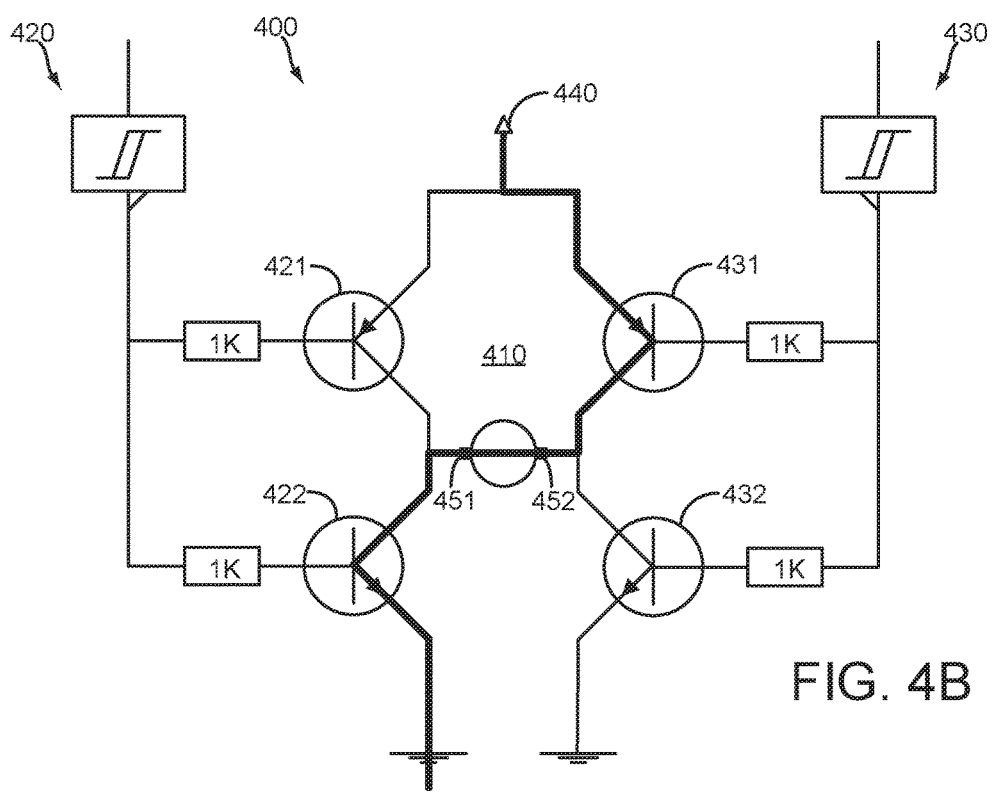

FIGS. 4A and 4B show an example circuit 400 that may be used for reversing a spin orientation of an electric motor (e.g. 120). Such a circuit may be used to spin the engine (e.g. 110) in a forward (e.g. the same direction as when the engine is operating to combust air and fuel) or reverse direction, and/or may be used to spin an electric compressor (e.g. 355) in a forward (e.g. where compressed air is routed to the engine and exhaust system) or reverse direction. Accordingly, circuit 400 schematically depicts an H-Bridge circuit that may be used to run a motor 410 (e.g. 120 and/or 241, 341)) in a first (forward) direction and alternately in a second (reverse) direction. Circuit 400 comprises a first (LO) side 420 and a second (HI) side 430. Side 420 includes transistors 421 and 422, while side 430 includes transistors 431 and 432. Circuit 400 further includes a power source 440.

In FIG. 4A, transistors 421 and 432 are activated (energized), while transistors 422 and 431 are off. In this configuration, the left lead 451 of motor 410 is connected to power source 440, and the right lead 452 of motor 410 is connected to ground. In this way, motor 400 may run in a forward (or default) direction. When operating the engine in a forward direction via the motor, the engine may be in a cranking mode for initial combustion commencement. Additionally and/or alternatively, when operating the engine in a forward direction via the motor, the engine (and motor or another motor) may be in a drive mode to drive the vehicle. It may be understood that in some examples, the engine may be spun in the forward (e.g. default) direction under conditions where the vehicle is stationary and it is desired only for the engine to be spun or rotated in the forward direction, without combustion.

In FIG. 4B, transistors 422 and 431 are activated (energized), while transistors 421 and 432 are off. In this configuration, the right lead 452 of motor 410 is connected to power source 440, and the left lead 451 of motor 410 is connected to ground. In this way, motor 410 may run in a reverse direction.

Thus, the description of FIGS. 1-4B may enable a system for a hybrid vehicle, comprising an engine including an intake and an exhaust system, where an exhaust catalyst may be positioned in the exhaust system, where an electric heater may be configured to heat the exhaust catalyst, where an intake air temperature sensor may be positioned in the intake, and where a throttle may be positioned in the intake. Such a system may further comprise a controller storing instructions in non-transitory memory that, when executed, cause the controller to command fully open the throttle and obtain a baseline intake air temperature via the intake air temperature sensor while routing a first air flow from the exhaust system to the intake without activating the electric heater. The controller may store further instructions to obtain a test intake air temperature while routing a second air flow from the exhaust system to the intake with the electric heater activated. The controller may store further instructions to indicate the electric heater is degraded in response to the test intake air temperature being below a threshold intake air temperature, the threshold intake air temperature set a predetermined amount greater than the baseline intake air temperature.

Such a system may further comprise a motor, and the controller may store further instructions to route the first air flow and the second air flow from the exhaust system to the intake via rotating the engine in reverse unfueled via the motor at a predetermined engine speed.

Such a system may in some examples further comprise a turbine positioned in the exhaust system, the turbine mechanically coupled to a compressor positioned in the intake. In some examples an electric booster may be positioned in the intake downstream of the compressor. Further, in some examples the system may further comprise an exhaust gas recirculation passage for recirculation of exhaust gas to the intake, the exhaust gas recirculation passage including an exhaust gas recirculation valve. In some examples, a wastegate passage may be positioned in parallel with the turbine, the wastegate passage including a wastegate valve. In such an example, the controller may store further instructions to route the first air flow and the second air flow from the exhaust system to the intake via activating the electric booster in reverse via the motor and maintaining the engine stopped from rotating, and via commanding open the wastegate valve and the exhaust gas recirculation valve.

Turning now to FIG. 5, a high-level flowchart for an example method 500 for conducting a diagnostic for an electric heater configured to heat an exhaust catalyst, is shown. Method 500 will be described with reference to the systems described herein and shown in FIGS. 1-4B, though it will be appreciated that similar methods may be applied to other systems without departing from the scope of this disclosure. Instructions for carrying out method 500 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-4B. The controller may employ actuators such as motor/generator (e.g. 241 or 341), throttle (e.g. 262 or 320), fuel injector(s) (e.g. 266 or 366), first VDE actuator (e.g. 276 or 376) second VDE actuator (e.g. 277 or 377), electric booster (e.g. 355), EGR valve (e.g. 352), wastegate actuator (e.g. 392), electric booster bypass valve (e.g. 361), electric heater actuator (e.g. 256a or 327a), etc., according to the methods described herein.

Method 500 begins at 505 and may include evaluating operating conditions. Operating conditions may be estimated, measured, and/or inferred, and may include one or more vehicle conditions, such as vehicle speed, battery state of charge, etc., various engine conditions, such as engine status (on or off), engine load, engine temperature, engine speed, torque demand, exhaust air-fuel ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 510, method 500 may include indicating whether conditions are met for conducting an electric heater diagnostic, where the electric heater diagnostic provides information related to whether the electric heater (e.g. 256 or 327) is functioning as desired. Conditions being met at 510 may include an engine temperature below a threshold engine temperature, such that the electric heater diagnostic is not complicated by engine heat due to sources other than the electric heater. Conditions being met at 510 may additionally or alternatively include an indication of a remote start event, where it is further indicated that the vehicle is not occupied via for example seat load cells, door sensing technology, onboard cameras, etc. In some examples, conditions being met at 510 may include a wakeup event of the controller, where the wakeup event corresponds to a wakeup event that has been scheduled specifically in order to conduct the electric heater diagnostic. For example, the wakeup event may be scheduled for a predetermined duration after a key-off event where the controller is put to sleep, for example. The predetermined duration may comprise a duration of time predicted to result in a temperature of the engine dropping below the threshold engine temperature, for example. Furthermore, conditions being met in response to the wakeup event may further comprise an indication that the vehicle is not occupied.

Conditions being met at 510 may additionally or alternatively include an indication that the electric heater is not functioning as desired. In some examples, conditions being met may additionally or alternatively include an indication that a predetermined amount of time has passed since a prior electric heater diagnostic has been conducted. Conditions being met at 510 may additionally or alternatively include an indication that the intake air temperature (IAT) sensor (e.g. 257 or 351) is functioning as desired, and that there is no indication of engine degradation aside from the potential degradation of the electric heater.

If, at 510, conditions are not yet indicated to be met for conducting the electric heater diagnostic, method 500 may proceed to 515. At 515, method 500 may include maintaining current vehicle operating parameters. For example, if the vehicle is not in operation when it is indicated that conditions are not met for conducting the electric heater diagnostic, then the vehicle may be maintained in its deactivated state. If the vehicle is in operation, for example with the engine operating to combust air and fuel, with or without supplemental energy provided via an onboard energy storage device, or where the vehicle is being propelled solely via electric power, such conditions may be maintained. Method 500 may then end.

Alternatively, at 510, if conditions are indicated to be met for conducting the electric heater diagnostic, method 500 may proceed to 520. At 520, method 500 may include indicating whether the vehicle is equipped with an electric booster (e.g. 355) positioned in an intake of an engine of the vehicle, or not. If the vehicle is not equipped with an electric booster, then method 500 may proceed to 525. While not explicitly illustrated, in some examples if the vehicle is equipped with the electric booster, but the electric booster is indicated to be degraded, then method 500 may similarly proceed to 525. At 525, method 500 may include conducting the electric heater diagnostic according to the method depicted at FIG. 6. Alternatively, if the vehicle is equipped with an electric booster (where the electric booster is indicated to be functioning as desired or expected), then method 500 may proceed to 530 from step 520, and may include conducting the electric heater diagnostic according to the method depicted at FIG. 7. Briefly, it may be more energy efficient to conduct the electric heater diagnostic according to the method of FIG. 7, than the method of FIG. 6. Thus, where possible, the method of FIG. 7 may preferentially be utilized to conduct the electric heater diagnostic. For example, which will be discussed in detail below, the method of FIG. 6 may include rotating the engine in a reverse orientation to conduct the diagnostic, whereas the method of FIG. 7 includes rotating the electric booster in a reverse orientation to conduct the diagnostic. It may be more energetically efficient to rotate the electric booster in reverse than the entire engine, and thus where possible, such a diagnostic may be conducted according to the method of FIG. 7.

Subsequent to conducting the electric heater diagnostic (details of which are provided below), method 500 may proceed to 535, and may include updating vehicle operating parameters as a function of the diagnostic conducted to determine whether the electric heater is functioning as desired. Method 500 may then end.

Turning now to FIG. 6, a method 600 for conducting an electric heater diagnostic by spinning an engine of the vehicle unfueled in reverse is shown. More specifically, method 600 may be conducted under circumstances where conditions are indicated to be met for conducting the electric heater diagnostic, and where it is further indicated that the vehicle does not include an electric booster positioned in an intake of the engine, or that the electric booster is degraded, as discussed above at FIG. 5.

Method 600 may continue from method 500 depicted at FIG. 5, and accordingly, method 600 is described with reference to the systems described herein and shown in FIGS. 1-2 and FIGS. 4A-4B. More specifically, since method 600 relies on a vehicle without an electric booster (or degraded booster), method 600 will be discussed with regard to FIG. 2, rather than with regard to FIG. 3. Instructions for carrying out method 600 may be executed via a controller (e.g. 212), and in conjunction with signals received from sensors of the engine system, such as temperature sensors, pressure sensors, and other sensors described in FIGS. 1-4B. The controller may employ actuators such as motor/generator (e.g. 241), throttle (e.g. 262), fuel injector(s) (e.g. 266), electric heater actuator (e.g. 256a), etc., according to the methods described herein.

Method 600 begins at 605, and may include maintaining the electric heater in an off configuration. More specifically, the controller may send a signal to the electric heater actuator (e.g. 256a), actuating it to be maintained off. Proceeding to 608, method 600 may include commanding open the throttle. For example, commanding open the throttle may include commanding open the throttle to a fully open, or maximally open, configuration. Furthermore, while not explicitly illustrated, at 608, method 600 may include sealing the intake manifold of the engine from the evaporative emissions system via commanding or maintaining closed the CPV, and in a situation where the vehicle includes EGR capabilities, an EGR valve may be commanded or maintained closed.

Proceeding to 610, method 600 may include rotating the engine in reverse for a first predetermined duration. Rotating the engine in reverse may be conducted by a motor/generator (e.g. 241 or 120) using an H-bridge circuit to enable reverse engine rotation, for example. While not explicitly illustrated, it may be understood that rotating the engine in reverse may further include the intake and exhaust valves coupled to each cylinder of the engine operating to open and close. In other words, even if the engine is a VDE engine capable of sealing individual engine cylinders, such cylinders may remain unsealed where intake and exhaust valves function to open and close, during the rotating the engine in reverse. More specifically, by rotating the engine unfueled in reverse with the intake and exhaust valves operating to open and close during the rotating, a vacuum (e.g. negative pressure with respect to atmospheric pressure) may build in the exhaust while a positive pressure (e.g. positive pressure with respect to atmospheric pressure) may build in the intake. Thus, an air flow may be directed or routed from the exhaust to the intake. It may be understood that the air flow routed from the exhaust to the intake while the electric heater is maintained off may comprise a first air flow. The predetermined duration of rotating the engine in reverse may comprise a duration predetermined to be long enough to obtain reliable baseline temperature data in the intake of the engine during the rotating of the engine in reverse. Furthermore, it may be understood that rotating the engine in reverse may comprise a direction opposite that of when the engine is rotated in a forward direction when combusting air and fuel. Still further, rotating the engine in reverse at 610 may include controlling engine speed (e.g. engine RPM) to a predetermined speed, commanding the motor/generator to a predetermined power level, etc.

Proceeding to 615, with the engine being rotated in reverse unfueled, and with the throttle commanded fully open, method 600 may include monitoring the IAT sensor (e.g. 257). For example, monitoring the IAT sensor at 615 may include obtaining a reading periodically (e.g. every second, every 5 seconds, etc.), to obtain a first baseline response of the IAT sensor. In some examples, all of the obtained measurements via the IAT sensor may be averaged or otherwise processed, to obtain an averaged or otherwise processed first baseline IAT response.

With the first baseline response (also referred to herein as baseline temperature, or baseline intake air temperature) obtained at 615, method 600 may proceed to 620. At 620, method 600 may include storing the first baseline response at the controller. At 625, method 600 may include maintaining the throttle open (and the CPV and EGR valve, where included, closed). Furthermore, at 625, method 600 may include maintaining rotating the engine in reverse. The engine may be maintained rotating in reverse at the same engine speed as the engine speed for obtaining the first baseline response, and/or may include operating the motor/generator at the same power level as the power level utilized for obtaining the first baseline response.

With the throttle maintained open and the engine continuing to be rotated in reverse at 625, method 600 may proceed to 630. At 630, method 600 may include activating the electric heater (e.g. 256) coupled to the exhaust catalyst (e.g. 270). The electric heater may be activated to a predetermined power level, for example. Such a predetermined power level may comprise a level where an amount of heat generated via the electric heater is sufficient to enable the electric heater diagnostic according to method 600 to be conducted with robust results expected. In other words, the predetermined power level may comprise a threshold heat output, where if the electric heater is activated to produce the threshold heat output, then a desired response from the IAT sensor may be expected provided that the electric heater is functioning as desired or expected. Air flow routed from the exhaust to the intake with the electric heater activated may in some examples be referred to herein as a second air flow.

Accordingly, proceeding to 635, method 600 may include indicating whether the response of the IAT sensor (referred to herein as a test temperature, or test intake air temperature, or test response) is greater than a first threshold IAT response (also referred to herein as the first threshold, or threshold temperature). The first threshold IAT response may be set as a function of the first baseline response, for example. More specifically, the first threshold IAT response may be set a predetermined amount higher than the first baseline response, where the predetermined amount higher may comprise an amount higher than the first baseline response that may be expected or predicted, provided the electric heater is functioning as desired. Thus, the first threshold IAT response may be further a function of the expected output of the electric heater.

Accordingly, if at 635, the IAT response is not greater than the first threshold IAT response, method 600 may proceed to 640. At 640, method 600 may include indicating whether a second predetermined duration has elapsed. In some examples, the second predetermined duration may comprise a same duration as the first predetermined duration. However, in other examples, the second predetermined duration may comprise a duration either longer or shorter than the first predetermined duration. It may be understood that the second predetermined duration may comprise a duration where, if the electric heater is functioning as desired, an IAT response greater than the first threshold IAT response, may be expected.

At 640, if the second predetermined duration has not elapsed, method 600 may return to 635 and may include continuing to monitor the IAT sensor response. Alternatively, if the second predetermined duration is indicated to have elapsed at 640, method 600 may proceed to 645. At 645, method 600 may include indicating the electric heater is not functioning as desired, or in other words, is degraded to at least some extent. Such an indication may be stored at the controller, for example.

Returning to 635, if on the other hand the IAT response is indicated to be greater than the first threshold IAT response, then method 600 may proceed to 660. At 660, method 600 may include indicating that the electric heater is functioning as desired. Such an indication may be stored at the controller, for example.

Whether the electric heater is indicated to be functioning as desired (step 660), or is indicated to be degraded (step 645), method 600 may proceed to 650. At 650, method 600 may include stopping rotating the engine in reverse, deactivating the electric heater, and may further include returning the throttle to a default position, or in other words a position the throttle was in prior to being commanded fully open. Method 600 may then proceed to 655, which may include returning to step 535 of method 500.

Accordingly, at 535 of method 500, method 500 may include updating vehicle operating parameters as a function of the results of the electric heater diagnostic. More specifically, in the event that the heater was indicated to be degraded, then at 535 method 500 may include illuminating a malfunction indicator light (MIL) at a dash of the vehicle, to alert a vehicle operator of a request to service the vehicle. Furthermore, if the heater was indicated to be degraded, mitigating actions may be taken at 535. For example, for vehicles equipped with a start/stop feature, the start/stop feature may be adjusted such that the engine may only be stopped if it is likely or predicted that a temperature of the exhaust catalyst will remain above a predetermined catalyst temperature for the duration of the start/stop event, such that the engine may not be requested to start at such events under conditions where the exhaust catalyst is below the predetermined catalyst temperature. Such an indication may be based on learned duration of S/S events during learned driving routines, and may be further a function of information related to traffic conditions retrieved wirelessly via the controller of the vehicle. In some examples, such mitigating action may additionally be a function of ambient temperature. For example, colder conditions may make it more likely that an exhaust catalyst temperature may decrease to below the predetermined catalyst temperature during a particular S/S event. Alternatively, in the event that the electric heater was indicated to be functioning as desired, then updating vehicle operating parameters at 535 may include maintaining vehicle operating parameters in their current status. Method 500 may then end.

Turning now to FIG. 7, it depicts a method 700 for conducting the engine heating diagnostic under conditions where the vehicle system includes an electric booster (e.g. 355). Method 700 continues from FIG. 5, and thus, method 700 will be described with reference to the systems described herein and shown in FIG. 1 and FIGS. 3-4B. More specifically, since method 700 relies on a vehicle with an electric booster, method 700 will be described with regard to FIG. 3, rather than with regard to FIG. 2. Instructions for carrying out method 700 may be executed via a controller (e.g. 212), and in conjunction with signals received from sensors of the engine system, such as temperature sensors, pressure sensors, and other sensors described in FIGS. 1-4B. The controller may employ actuators such as motor/generator (e.g. 341), throttle (e.g. 320), fuel injector(s) (e.g. 366), first VDE actuator (e.g. 376) second VDE actuator (e.g. 377), electric heater actuator (e.g. 327*a*), electric booster actuator (e.g. 355*b*), electric booster bypass valve (e.g. 361), EGR valve (e.g. 352), wastegate actuator (e.g. 392), etc., according to the methods described herein.

Method 700 begins at 705, and may include maintaining the electric heater in an off configuration. Proceeding to 710, method 700 may include sealing engine cylinders. More specifically, for a vehicle equipped with a VDE engine, sealing engine cylinders at 710 may include the controller sending a signal to the first VDE actuator and the second VDE actuator, actuating closed intake and exhaust valves coupled to each cylinder. In this way, all of the engine cylinders may be sealed.

It may be understood that the method of FIG. 7 may in some examples be conducted without sealing the engine cylinders, without departing from the scope of this disclosure. More specifically, as will be discussed below, the methodology of FIG. 7 depicts methodology that routes air flow around the engine. By sealing the engine cylinders, such air flow may be effectively prevented from traveling through the engine in any way. However, if the engine cylinders are not able to be sealed, the engine still represents a large restriction to air flow, and thus air flow routed around the engine may comprise a least restrictive path for such flow, and thus, such methodology as will be discussed in further detail below may be conducted even if the engine cylinders are not readily sealable.

Proceeding to 715, method 700 may include commanding open the wastegate (e.g. 391), commanding open the EGR valve (e.g. 352), and commanding open the throttle (e.g. 320). While not explicitly illustrated, at 715, method 700 may further include commanding or maintaining closed the electric booster bypass valve (e.g. 361). Still further, it may be understood that commanding open the throttle, wastegate, and EGR valve may comprise commanding said throttle, wastegate, and EGR valves to fully open configurations. Additionally, while not explicitly illustrated, it may be understood that at 715, method 700 may include commanding or maintaining closed a CPV (e.g. 394).

With the throttle, wastegate, and EGR valve each commanded to fully open positions, it may be understood that there is a low restriction path for air flow from intake to exhaust. More specifically, air flow may be routed around the restrictive turbine via the open wastegate, and routed around the restrictive engine via the open EGR valve.

Proceeding to 720, method 700 may include activating the electric booster in a reverse orientation. More specifically, the motor (e.g. 341 or 120) may control the electric booster to rotate in the reverse orientation via an H-bridge circuit, as described above with regard to FIGS. 4A-4B. It may be understood that, when activated in the forward direction or orientation, a positive pressure with respect to atmospheric pressure may build in the intake manifold and exhaust, while a vacuum (negative pressure with respect to atmospheric pressure) may develop in the intake passage upstream of the electric booster. Alternatively, when the electric booster is activated in the reverse orientation, a negative pressure with respect to atmospheric pressure (e.g. vacuum) may develop in the intake manifold and exhaust system, while a positive pressure with respect to atmospheric pressure may develop upstream of the electric booster in the intake passage. In this way, atmospheric air may be brought into the exhaust passage and routed around the turbine (via the open wastegate) and around the engine (via the open EGR valve) en route to the intake.

Activating the electric booster in the reverse orientation at 720 may include activating the electric booster at a predetermined power level, rotating the electric booster at a predetermined speed (e.g. predetermined RPM), etc. Furthermore, activating the electric booster in the reverse orientation at 720 may include activating the electric booster in the reverse orientation for a third predetermined duration. Still further, as discussed above, air flow from the exhaust to the intake under conditions where the electric heater is off may comprise a first air flow.

Accordingly, proceeding to 725, method 700 may include monitoring the IAT sensor (e.g. 351) to obtain a second baseline response of the IAT sensor (also referred to herein as a baseline temperature, or a baseline intake air temperature). For example, monitoring the IAT sensor at 725 may include obtaining a reading periodically (e.g. every second, every 5 seconds, etc.), to obtain the second baseline response of the IAT sensor. In some examples, all of the obtained measurements via the IAT sensor may be averaged or otherwise processed, to obtain an averaged or otherwise processed second baseline IAT response.

With the second baseline response obtained at 725, method 700 may proceed to 730. At 730, method 700 may include storing the second baseline (baseline temperature, or baseline intake air temperature) at the controller. Proceeding to 735, method 700 may include maintaining open the wastegate, throttle, and EGR valve. Furthermore, at 735, method 700 may include maintaining sealed the engine cylinders (where applicable). Still further, at 735, method 700 may include maintaining activated the electric booster at either the predetermined power level or predetermined speed. In other words, it may be understood that at 735, method 700 may include maintaining the electric booster activated at the same predetermined speed and/or power level as the electric booster was activated at while obtaining the second baseline response.

Proceeding to 740, method 700 may include activating the electric heater coupled to the exhaust catalyst. Similar to that discussed above at FIG. 6, the electric heater may be activated to a predetermined power level, the predetermined power level comprising a power level where an amount of heat generated via the electric heater is sufficient to enable the electric heater diagnostic according to method 700 to be conducted with robust results expected. In other words, the predetermined power level may comprise a threshold heat output, where if the electric heater is activated to produce the threshold heat output, then a desired response from the IAT sensor may be expected provided that the electric heater is functioning as desired or expected. As discussed above, air flow from the exhaust to the intake under conditions where the electric heater is activated may comprise a second air flow.

Accordingly, proceeding to 745, method 700 may include indicating whether the response of the IAT sensor is greater than a second threshold IAT response (also referred to herein as a test temperature, or a test intake air temperature). The second threshold IAT response may be set as a function of the second baseline response, for example. More specifically, the second threshold IAT response may be set a predetermined amount higher than the second baseline response, where the predetermined amount higher may comprise an amount higher than the second baseline response that may be expected or predicted, provided the electric heater is functioning as desired. In some examples, the second threshold IAT response may additionally be set as a function of the predicted or expected heat output of the electric heater.

Accordingly, if at 745, the IAT response is not greater than the second threshold IAT response, method 700 may proceed to 750. At 750, method 700 may include indicating whether a fourth predetermined duration has elapsed. In some examples, the fourth predetermined duration may comprise a same duration as the third predetermined duration. However, in other examples, the fourth predetermined duration may comprise a duration either longer or shorter than the third predetermined duration. It may be understood that the fourth predetermined duration may comprise a duration where, if the electric heater is functioning as desired, an IAT response greater than the second threshold IAT response, may be expected.

At 750, if the fourth predetermined duration has not elapsed, method 700 may return to 745 and may include continuing to monitor the IAT sensor response. Alternatively, if the fourth predetermined duration is indicated to have elapsed at 750, method 700 may proceed to 755. At 755, method 700 may include indicating the electric heater is not functioning as desired, or in other words, is degraded to at least some extent. Such an indication may be stored at the controller, for example.

Returning to 745, if on the other hand the IAT response is indicated to be greater than the second threshold IAT response, then method 700 may proceed to 770. At 770, method 700 may include indicating that the electric heater is functioning as desired. Such an indication may be stored at the controller, for example.

Whether the electric heater is indicated to be functioning as desired (step 770), or is indicated to be degraded (step 755), method 700 may proceed to 760. At 760, method 700 may include stopping operating the electric booster in reverse, deactivating the electric heater, and may further include returning the throttle to a default position, or position the throttle was in prior to being commanded fully open. Still further, at 760, method 700 may include commanding closed the wastegate and commanding closed the EGR valve. Method 700 may then proceed to 765, which may include returning to step 535 of method 500.

Accordingly, at 535 of method 500, method 500 may include updating vehicle operating parameters as a function of the results of the electric heater diagnostic. More specifically, in the event that the heater was indicated to be degraded, then at 535 method 500 may include illuminating a malfunction indicator light (MIL) at a dash of the vehicle, to alert a vehicle operator of a request to service the vehicle. Furthermore, if the heater was indicated to be degraded, mitigating actions may be taken at 535. For example, as discussed above, for vehicles equipped with a start/stop feature, the start/stop feature may be adjusted such that the engine may only be stopped if it is likely that a temperature of the exhaust catalyst will remain above a predetermined catalyst temperature for the duration of the start/stop event, such that the engine may not be requested to start at such events under conditions where the exhaust catalyst is below the predetermined catalyst temperature. In the event that the electric heater was indicated to be functioning as desired, then updating vehicle operating parameters at 535 may include maintaining vehicle operating parameters in their current status. Method 500 may then end.

Thus, the flow charts of FIGS. 5-7 may enable a method comprising diagnosing an electric heater configured to increase a temperature of an exhaust catalyst positioned in an exhaust system of an engine of a vehicle by activating the electric heater, routing air flow from the exhaust system to an intake of the engine, and indicating the electric heater is degraded based on a test temperature in the intake being below a threshold temperature.

In one example, such a method may include routing air flow from the exhaust system to the intake of the engine without activating the electric heater prior to activating the electric heater, to obtain a baseline temperature in the intake of the engine, and where the threshold temperature is a predetermined amount greater than the baseline temperature. As discussed, obtaining the baseline temperature and the test temperature may be via an intake air temperature sensor.

In an example where the engine includes an electric booster positioned in the intake of the engine, such a method may include routing air flow from the exhaust system to the intake via activating the electric booster in a reverse orientation to apply negative pressure with respect to atmospheric pressure on the exhaust system.

In an example where the engine does not include the electric booster, or where the electric booster is indicated to be degraded, such a method may include routing air flow from the exhaust system to the intake via rotating the engine unfueled in reverse to apply negative pressure with respect to atmospheric pressure on the exhaust system.

Whether routing air flow from the exhaust system to the intake of the engine is via rotating the engine unfueled in reverse or via activating the electric booster in the reverse orientation, such a method may further include commanding fully open a throttle positioned in the intake in order to route air flow from the exhaust system to the intake.

In situations where the method includes routing air flow from the exhaust system to the intake via activating the electric booster in reverse, such a method may further comprise commanding open an exhaust gas recirculation valve positioned in an exhaust gas recirculation passage, commanding open a wastegate valve positioned in a wastegate passage, the wastegate passage configured to bypass a turbine positioned in the exhaust system, and commanding closed an electric booster bypass valve configured in parallel with the electric booster and further configured to enable air flow to bypass the electric booster when the electric bypass valve is commanded open. In some examples of such a method, the method may further comprise sealing all cylinders of the engine via commanding closed intake and exhaust valves coupled to all cylinders of the engine.

In one example of such a method, diagnosing the electric heater may include sealing an evaporative emissions system from the intake of the engine, the evaporative emissions system configured to trap and store fuel vapors from a fuel system of the vehicle.

Furthermore, in some examples the vehicle may comprise a vehicle operated via a vehicle operator, whereas in other examples the vehicle may comprise an autonomous vehicle. Whether the vehicle is operated via a vehicle operator, or where the vehicle comprises an autonomous vehicle, diagnosing the electric heater according to such a method may include conditions where the vehicle is indicated to be unoccupied. For example, seat load cells, door sensors, onboard cameras, etc., may be utilized to infer vehicle occupancy.

Still further, in such a method, the engine may be equipped with a start/stop feature that automatically stops the engine in response to a set of predetermined conditions being met while the engine is combusting air and fuel. Further, in an example where the electric heater is indicated to be degraded, such a method may include updating the start/stop feature to prevent the engine from stopping at start/stop events where it is predicted that the temperature of the exhaust catalyst will drop below a threshold exhaust catalyst temperature during the start/stop event.

In another example, the flow charts of FIGS. 5-7 may enable a method comprising diagnosing an electric heater coupled to an exhaust catalyst positioned in an exhaust system of an engine of a vehicle via obtaining a baseline temperature in an intake of the engine under conditions where an air flow is routed from the exhaust system to the intake without activation of the electric heater and then subsequently obtaining a test temperature of the intake of the engine under conditions where the air flow is routed from the exhaust system to the intake with activation of the electric heater, where diagnosing the electric heater includes indicating the electric heater is functioning as desired in response to the test temperature being greater than a threshold temperature.

In such a method, the threshold temperature may be set a predetermined amount greater than the baseline temperature, and wherein the predetermined amount greater than the baseline temperature is a function of an output of the electric heater when activated.

In such a method, the method may include, in a first condition, operating the vehicle in a first mode where routing the air flow from the exhaust system to the intake is via an electric booster positioned in the intake of the engine and where the electric booster is controlled to operate in a reverse orientation. Alternatively, a second condition may include operating the vehicle in a second mode where routing the air flow from the exhaust system to the intake is via rotating the engine unfueled in reverse.

In such a method, the method may include operating the vehicle in the first mode under conditions where the vehicle includes an electric booster that is not indicated to be degraded, or under conditions where the vehicle includes an electric booster and the state of charge of an on-board battery is below a threshold, and operating the vehicle in the second mode under conditions where the vehicle is not equipped with the electric booster, or under conditions where the electric booster is indicated to be degraded.

In such a method, operating the vehicle in both the first mode and the second mode may include commanding fully open a throttle positioned in the intake of the engine, the throttle positioned downstream of the electric booster under conditions where the vehicle includes the electric booster.

In such a method, routing the air flow from the exhaust system to the intake in the first mode may include routing the air flow such that the air flow bypasses a turbine positioned in the exhaust system and additionally bypasses the engine. Alternatively, routing the air flow from the exhaust system to the intake in the second mode may include routing the air flow through the engine.

Turning now to FIG. 8, an example timeline 800 for conducting an electric heater diagnostic according to the method of FIGS. 5-6, is shown. More specifically, example timeline 800 depicts an example where the electric heater diagnostic is conducted via rotating the engine unfueled in reverse. Accordingly, timeline 800 will be discussed with regard to the systems of FIGS. 1-2, and FIGS. 4A-4B. Timeline 800 includes plot 805, indicating whether conditions are met for conducting the electric heater (EH) test diagnostic, over time. Timeline 800 further includes plot 810, indicating whether the engine is rotating in a forward (fwd) or reverse (rev) direction, or is not rotating (off), over time. Timeline 800 further includes plot 815, indicating a response of an IAT sensor (e.g. 257), over time. Line 816 represents the first baseline response, and line 817 represents the first threshold IAT response, as discussed above with regard to FIGS. 5-6. Timeline 800 further includes plot 820, indicating a position of a throttle (e.g. 262), over time. It may be understood that the throttle may be open (e.g. fully open), or closed (e.g. fully closed), or may be somewhere in between. Timeline 800 further includes plot 825, indicating a status of the electric heater, over time. The electric heater may be on, or off, over time. Timeline 800 further includes plot 830, indicating whether the electric heater is degraded (yes), or not (no), over time.

At time t0, conditions are not indicated to be met for conducting the electric heater diagnostic (plot 805). The engine is off (plot 810), the throttle is in a default position (plot 820), or position the throttle was in just prior to the engine off event, the electric heater is off (plot 825), and there is not already an indication that the electric heater is degraded (plot 830). Thus, it may be understood that the vehicle is in a key-off condition, and it may further be understood that the vehicle controller is being maintained in a sleep mode. Thus, the IAT sensor may not be actively taking readings of intake air temperature, however, for clarity, intake air temperature is indicated (plot 815), at time t0.

At time t1, conditions are indicated to be met for conducting the electric heater diagnostic. More specifically, it may be understood that at time t1, the controller of the vehicle is triggered to an awake mode, in order to conduct the electric heater diagnostic. In other words, it may be understood that the electric heater diagnostic was scheduled at the previous key-off event, such that a timer was set at the controller, triggering the controller to awake from the sleep mode at time t1. Furthermore, at time t1, other conditions such as those described in detail with regard to step 510 of method 500, may be understood to be met.

With conditions being met at time t1 for conducting the electric heater diagnostic, the throttle is commanded to a fully open position. Next, at time t2, the engine is commanded to rotate in reverse, via a motor (e.g. 120 or 241). While not explicitly illustrated, it may be understood that the engine may be controlled to rotate at the predetermined speed or predetermined engine RPM, and may further include commanding the motor to the predetermined power level, etc. Furthermore, it may be understood that rotating the engine in reverse includes rotating the engine in reverse unfueled.

With the engine rotating in reverse and with the throttle commanded fully open, the IAT sensor response is recorded between time t2 and t3. Recording the IAT sensor response between time t2 and t3 results in the first baseline response, represented via line 816, being obtained and stored at the controller.

With the first baseline response having been obtained by time t3, the electric heater is activated (plot 825). As discussed, the electric heater may be activated to a predetermined power level in order to produce a threshold heat output (provided the electric heater is functioning as desired).

With the electric heater activated at time t3, and with the throttle maintained fully open and with the engine maintained rotating in reverse unfueled, the IAT sensor is again monitored between time t3 and t4. Between time t3 and t4, the IAT response does not reach or exceed the first threshold IAT response (represented by line 817), where the first threshold IAT response is set as a function of the first baseline response (and in some examples as a function of expected electric heater output), as discussed above. At time t4, it may be understood that the second predetermined threshold duration elapses (see step 640 of method 600). Because the IAT response did not reach or exceed the first threshold IAT response prior to the second predetermined threshold duration elapsing, the electric heater is indicated as being degraded (plot 830) and time t4. As the electric heater is indicated to be degraded at time t4, conditions are no longer indicated to be met for conducting the diagnostic (plot 805), the engine is deactivated, or turned off (plot 810), the throttle is returned to its position prior to conducting the diagnostic (plot 820), and the electric heater is deactivated (plot 825). Between time t4 and t5, it may be understood that the controller is returned to a sleep mode of operation.

Turning now to FIG. 9, an example timeline 900 is shown, depicting a timeline for conducting the electric heater diagnostic under conditions where the vehicle includes an electric booster. Furthermore, example timeline 900 depicts an example where the vehicle engine comprises a variable displacement engine, capable of sealing engine cylinders. As timeline 900 depicts an example where the vehicle includes an electric booster, timeline 900 will be discussed with regard to FIG. 1 and FIGS. 3-4B, and with regard to methods of FIG. 5 and FIG. 7. Timeline 900 includes plot 905, indicating whether conditions are met for conducting the electric heater test diagnostic, and plot 910, indicating engine status (e.g. rotating in a forward (fwd) or reverse (rev) direction, or off), over time. Timeline 900 further includes plot 915, indicating whether the cylinders of the engine are sealed, or unsealed, over time. It may be understood that sealed cylinders include cylinders with both their intake and exhaust valves in fully closed configurations.

Timeline 900 further includes plot 920, indicating a response of the IAT sensor (e.g. 351), over time. As the intake temperature rises, the IAT sensor response may increase (+), and as the intake temperature decreases, the IAT sensor response may decrease (−). Line 921 represents the second baseline response (see step 725 of method 700), and line 922 represents the second threshold IAT response (see step 745 of method 700).

Timeline 900 further includes plot 925, indicating whether the electric heater (e.g. 327) is on or off, plot 930, indicating whether the wastegate (e.g. 391) is fully open or fully closed, plot 935, indicating whether the throttle (e.g. 320) is fully open or fully closed, plot 940, indicating whether the EGR valve (e.g. 352) is fully open or fully closed, and plot 945, indicating a status of the electric booster, over time. The electric booster may be rotating in a forward direction (fwd), reverse direction (rev), or may be off, over time. Timeline 900 further includes plot 950, indicating whether the electric heater is indicated to be degraded (yes) or not (no), over time.

At time t0, conditions are not yet indicated to be met for conducting the electric heater (EH) diagnostic (plot 905). The engine is off (plot 910), and the cylinders of the engine are not actively sealed (plot 915). The electric heater is off (plot 925), the wastegate is closed (plot 930), the EGR valve is closed (plot 940), and the electric booster is off (plot 945). Furthermore, it may be understood that at time t0, the vehicle is in a key-off state. Accordingly, the throttle is in a default position, or position the throttle was in at the key-off event (plot 935). Still further, at time t0, the electric heater is not indicated to be degraded (plot 950). With the vehicle in the key-off state at time t0, it may be understood that the IAT sensor (e.g. 351) may not be actively monitoring temperature in the intake of the engine, however, for clarity the temperature response if it were being communicated to the controller, is illustrated (plot 920). In other words, with the vehicle in the key-off condition, the controller may be understood to be in a sleep mode of operation.

Between time t0 and t1, the controller is maintained in the sleep mode, as conditions are not indicated to be met for conducting the electric heater diagnostic. However, at time t1, conditions are indicated to be met. Conditions being met at time t1 may include the conditions discussed above at step 510 of method 500 being met, for example. Conditions being met at time t1 may further include the controller transitioning from the sleep mode, to an awake mode. In other words, in this example timeline 900 it may be understood that the electric heater diagnostic was scheduled at the previous key-off event, and at time t1 a timer that was set elapses, thus triggering the controller to the awake mode in order to conduct the diagnostic.

Accordingly, with conditions met for conducting the electric heater diagnostic a time t1, at time t2, the engine cylinders are commanded sealed. More specifically, the controller sends a signal to the first VDE actuator (e.g. 376) and second VDE actuator (e.g. 377), actuating the intake and exhaust valves coupled to each engine cylinder, to fully closed configurations. With the engine cylinders sealed, at time t3, the throttle is commanded to the fully open configuration, the wastegate is commanded fully open, and the EGR valve is commanded fully open. In this way, a low-restriction path may be created from the electric booster to the exhaust passage and atmosphere, as air flow may bypass the restrictive turbine, and may further bypass the restrictive engine. Furthermore, while not explicitly illustrated, at time t3 the electric booster bypass valve (e.g. 361) is maintained or commanded closed, and the CPV (e.g. 394), is commanded or maintained closed.

At time t4, the electric booster is activated to spin in reverse, thus generating positive pressure with respect to atmospheric pressure in the intake upstream of the electric booster, while generating a vacuum (e.g. negative pressure with respect to atmospheric pressure) in the intake manifold and exhaust system. The electric booster may be activated to a predetermined power level, for example, or may be controlled to spin in reverse at a predetermined speed, etc. With the electric booster activated at time t4, the IAT sensor response is monitored between time t4 and t5, to obtain the second baseline response, represented by line 921. The second baseline response is stored at the controller by time t5.

With the second baseline response obtained by time t5, the electric heater is activated (plot 925). As discussed above, the electric heater may be activated to a predetermined power level, the predetermined power level comprising a power level where an amount of heat generated via the electric heater is sufficient to enable the electric heater diagnostic according to method 700 to be conducted with robust results expected.

With the second baseline obtained between time t4 and t5, the second threshold IAT response is set, represented by line 922, the second threshold IAT response set as a function of the second baseline response, as discussed above, and further set as a function of an expected electric heater output (provided the electric heater is not degraded).

With the second baseline obtained and the second threshold IAT response set, at time t5 the electric heater is activated. As discussed, the electric heater may be activated to a predetermined power level in order to produce a threshold heat output (provided the electric heater is functioning as desired).

With the electric heater activated, and with the engine cylinders maintained sealed, the throttle maintained fully open, the wastegate maintained fully open, the EGR valve maintained fully activated, and the electric booster maintained being rotated in reverse (at the same speed/power level as between time t4 and t5), the IAT sensor is monitored between time t5 and t6. Specifically, the IAT sensor is monitored for whether the IAT sensor response increases to or beyond the second threshold IAT response, represented by line 922. Between time t5 and t6, the IAT sensor response is indicated to exceed the second threshold IAT response. Accordingly, at time t6 it is indicated that the electric heater is not degraded (plot 950), or is functioning as desired or expected. With the electric heater diagnostic having resulted in the electric heater being indicated to be functioning as desired, at time t6 conditions are no longer indicated to be met for conducting the electric heater test diagnostic. Accordingly, the electric heater is commanded off, the wastegate is commanded closed, the throttle is returned to its default position (e.g. position the throttle was in at the previous key-off event), the EGR valve is commanded closed, and the electric booster is commanded off. While not explicitly illustrated, it may be understood that subsequent to the commanding closed the wastegate, throttle, EGR valve, and commanding off the electric heater and electric booster, the vehicle controller may return to sleep mode, and may be maintained in such a mode between time t6 and t7.

Furthermore, as discussed herein, the methods and systems may be applicable to autonomous vehicles. Accordingly, turning now to FIG. 10, a block diagram of an example autonomous driving system 1000 that may operate, for example, the vehicle system 100, described above at FIG. 1. Herein, the vehicle system 100 will be referred to simply as a "vehicle". The autonomous driving system 1000, as shown, includes a user interface device 1010, a navigation system 1015, at least one autonomous driving sensor 1020, and an autonomous mode controller 1025.

The user interface device 1010 may be configured to present information to vehicle occupants, under conditions wherein a vehicle occupant may be present. However, it may be understood that the vehicle may be operated autonomously in the absence of vehicle occupants, under certain conditions. The presented information may include audible information or visual information. Moreover, the user interface device 1010 may be configured to receive user inputs. Thus, the user interface device 1010 may be located in the passenger compartment (not shown) of the vehicle. In some possible approaches, the user interface device 1010 may include a touch-sensitive display screen.

The navigation system 1015 may be configured to determine a current location of the vehicle using, for example, a Global Positioning System (GPS) receiver configured to triangulate the position of the vehicle relative to satellites or terrestrial based transmitter towers. The navigation system 1015 may be further configured to develop routes from the current location to a selected destination, as well as display a map and present driving directions to the selected destination via, for example, the user interface device 1010.

The autonomous driving sensors 1020 may include any number of devices configured to generate signals that help navigate the vehicle. Examples of autonomous driving sensors 1020 may include a radar sensor, a lidar sensor, a vision sensor (e.g. a camera), vehicle to vehicle infrastructure networks, or the like. The autonomous driving sensors 1020 may enable the vehicle to "see" the roadway and vehicle surroundings, and/or negotiate various obstacles while the vehicle 100 is operating in autonomous mode. The autonomous driving sensors 1020 may be configured to output sensor signals to, for example, the autonomous mode controller 1025.

The autonomous mode controller 1025 may be configured to control one or more subsystems 1030 while the vehicle is operating in the autonomous mode. Examples of subsystems 1030 that may be controlled by the autonomous mode controller 1025 may include a brake subsystem, a suspension subsystem, a steering subsystem, and a powertrain subsystem. The autonomous mode controller 1025 may control any one or more of these subsystems 1030 by outputting signals to control units associated with subsystems 1030. In one example, the brake subsystem may comprise an anti-lock braking subsystem, configured to apply a braking force to one or more of wheels (e.g. 135). Discussed herein, applying the braking force to one or more of the vehicle wheels may be referred to as activating the brakes. To autonomously control the vehicle, the autonomous mode controller 1025 may output appropriate commands to the subsystems 1030. The commands may cause the subsystems to operate in accordance with the driving characteristics associated with the selected driving mode. For example, driving characteristics may include how aggressively the vehicle accelerates and decelerates, how much space the vehicle leaves behind a front vehicle, how frequently the autonomous vehicle changes lanes, etc.

In this way, an electric heater diagnostic may be conducted on an electric heater coupled to an exhaust catalyst, without introducing costly thermocouples into the exhaust catalyst. Furthermore, by periodically diagnosing whether the electric heater is functioning as desired, an amount of undesired emissions released to atmosphere may be reduced or avoided, and engine operation may be improved. Still further, by diagnosing the electric heater in such fashion as described herein, the diagnostic may be conducted without a vehicle operator or passengers being in the vehicle, which may improve customer satisfaction.

The technical effect is to recognize that in hybrid vehicles, the engine may be rotated unfueled in a reverse orientation, and in an example where the vehicle includes an electric booster, the electric booster may similarly be actuated in reverse. In each case, such action may result in atmospheric air being drawn through the exhaust system, and to the intake system, before being expelled to atmosphere via the intake passage. Thus, a technical effect is to recognize that such air flow may be useful for diagnosing an electric heater coupled to an exhaust catalyst, by first obtaining a baseline air flow in the absence of heat provided via the electric heater, and then obtaining a test air flow in the presence of heat provided via the electric heater. A further technical effect is to recognize that there may be circumstances where it is desirable to use the electric booster, where present, rather than rotating the entire engine in reverse to produce said air flow. More specifically, it is recognized that for hybrid vehicles, onboard energy storage device state of charge is an important parameter for fuel economy, and thus it is desirable to reduce use of the onboard energy storage device whenever possible. As rotating the engine may utilize more energy than rotating the electric booster, a technical effect is to recognize that it may be desirable from an energy use standpoint to use the electric booster to conduct the electric heater test when possible. Accordingly, a still further technical effect is to recognize that, under conditions where an electric booster is present and there is additionally an EGR passage that can be utilized to route air flow around the engine, and a wastegate passage that can be utilized to route air flow around a turbine, such action may greatly reduce an amount of energy utilized by the electric booster to route air flow from the exhaust to the intake of the engine. A still further technical effect is to recognize that, under conditions where the EGR passage and wastegate passage are utilized to draw air flow from the exhaust to the intake via the electric booster, restrictive air flow through the engine may be avoided via sealing engine cylinders under conditions where the engine includes a variable displacement engine.

The systems described herein, and with regard to FIGS. 1-4B and FIG. 10, along with the methods depicted herein, and described with regard to FIGS. 5-7, may enable one or more systems and one or more methods. In one example, a method comprises diagnosing an electric heater configured to increase a temperature of an exhaust catalyst positioned in an exhaust system of an engine of a vehicle by activating the electric heater, routing air flow from the exhaust system to an intake of the engine, and indicating the electric heater is degraded based on a test temperature in the intake being below a threshold temperature. In a first example of the method, the method further comprises routing air flow from the exhaust system to the intake of the engine without activating the electric heater prior to activating the electric heater, to obtain a baseline temperature in the intake of the engine, and where the threshold temperature is a predetermined amount greater than the baseline temperature. A second example of the method optionally includes the first example, and further includes wherein obtaining the baseline temperature and the test temperature is via an intake air temperature sensor. A third example of the method optionally includes any one or more or each of the first through second examples, and further comprises under conditions where the engine includes an electric booster positioned in the intake of the engine, routing air flow from the exhaust system to the intake via activating the electric booster in a reverse orientation to apply negative pressure with respect to atmospheric pressure on the exhaust system. A fourth example of the method optionally includes any one or more or each of the first through third examples, and further comprises under conditions where the engine does not include the electric booster, or where the electric booster is indicated to be degraded, routing air flow from the exhaust system to the intake via rotating the engine unfueled in reverse to apply negative pressure with respect to atmospheric pressure on the exhaust system. A fifth example of the method optionally includes any one or more or each of the first through fourth examples, and further comprises commanding fully open a throttle positioned in the intake in order to route air flow from the exhaust system to the intake of the engine, under conditions where routing air flow is via rotating the engine unfueled in reverse or via activating the electric booster in the reverse orientation. A sixth example of the method optionally includes any one or more or each of the first through fifth examples, and further includes wherein routing air flow from the exhaust system to the intake via activating the electric booster in reverse further comprises commanding open an exhaust gas recirculation valve positioned in an exhaust gas recirculation passage; commanding open a wastegate valve positioned in a wastegate passage, the wastegate passage configured to bypass a turbine positioned in the exhaust system; and commanding closed an electric booster bypass valve configured in parallel with the electric booster, and further configured to enable air flow to bypass the electric booster when the electric bypass valve is commanded open. A seventh example of the method optionally includes the sixth example, and further includes wherein routing air flow from the exhaust system to the intake via activating the electric booster in reverse further comprises: sealing all cylinders of the engine via commanding closed intake and exhaust valves coupled to all cylinders of the engine. An eighth example of the method optionally includes any one or more or each of the first through seventh examples, and further includes wherein diagnosing the electric heater includes sealing an evaporative emissions system from the intake of the engine, the evaporative emissions system configured to trap and store fuel vapors from a fuel system of the vehicle. A ninth example of the method optionally includes any one or more or each of the first through eighth examples, and further includes wherein the vehicle comprises a vehicle operated via a vehicle operator, or where the vehicle comprises an autonomous vehicle; and wherein diagnosing the electric heater includes conditions where the vehicle is unoccupied. A tenth example of the method optionally includes any one or more or each of the first through ninth examples, and further includes wherein the engine is equipped with a start/stop feature that automatically stops the engine in response to a set of predetermined conditions being met while the engine is combusting air and fuel; and wherein under conditions where the electric heater is indicated to be degraded, updating the start/stop feature to prevent the engine from stopping at start/stop events where it is predicted that the temperature of the exhaust catalyst will drop below a threshold exhaust catalyst temperature during the start/stop event.

Another example of a method comprises diagnosing an electric heater coupled to an exhaust catalyst positioned in an exhaust system of an engine of a vehicle via obtaining a baseline temperature in an intake of the engine under conditions where an air flow is routed from the exhaust system to the intake without activation of the electric heater and then subsequently obtaining a test temperature of the intake of the engine under conditions where the air flow is routed from the exhaust system to the intake with activation of the electric heater, where diagnosing the electric heater includes indicating the electric heater is functioning as desired in response to the test temperature being greater than a threshold temperature. In a first example of the method, the method further includes wherein the threshold temperature is set a predetermined amount greater than the baseline temperature; and wherein the predetermined amount greater than the baseline temperature is a function of an output of the electric heater when activated. A second example of the method optionally includes the first example, and further comprises in a first condition, operating the vehicle in a first mode where routing the air flow from the exhaust system to the intake is via an electric booster positioned in the intake of the engine and where the electric booster is controlled to operate in a reverse orientation; and in a second condition, operating the vehicle in a second mode where routing the air flow from the exhaust system to the intake is via rotating the engine unfueled in reverse. A third example of the method optionally includes any one or more or each of the first and second examples, and further comprises operating the vehicle in the first mode under conditions where the vehicle includes an electric booster, or under conditions where the vehicle includes an electric booster and the state of charge of an on-board battery is below a threshold, and operating the vehicle in the second mode under conditions where the vehicle is not equipped with the electric booster, or under conditions where the electric booster is indicated to be degraded. A fourth example of the method optionally includes any one or more or each of the first through third examples, and further includes wherein operating the vehicle in both the first mode and the second mode includes commanding fully open a throttle positioned in the intake of the engine, the throttle positioned downstream of the electric booster under conditions where the vehicle includes the electric booster. A fifth example of the method optionally includes any one or more or each of the first through fourth examples of the method and further includes wherein routing the air flow from the exhaust system to the intake in the first mode includes routing the air flow such that the air flow bypasses a turbine positioned in the exhaust system and additionally bypasses the engine; and wherein routing the air flow from the exhaust system to the intake in the second mode includes routing the air flow through the engine.

A system for a hybrid vehicle comprises an engine including an intake and an exhaust system; an exhaust catalyst positioned in the exhaust system; an electric heater configured to heat the exhaust catalyst; an intake air temperature sensor positioned in the intake; a throttle positioned in the intake; and a controller storing instructions in non-transitory memory, that when executed, cause the controller to: command fully open the throttle; obtain a baseline intake air temperature via the intake air temperature sensor while routing a first air flow from the exhaust system to the intake without activating the electric heater; obtain a test intake air temperature while routing a second air flow from the exhaust system to the intake with the electric heater activated; and indicate the electric heater is degraded in response to the test intake air temperature being below a threshold intake air temperature, the threshold intake air temperature set a predetermined amount greater than the baseline intake temperature. In a first example of the system, the system further comprises a motor, and wherein the controller stores further instructions to route the first air flow and the second air flow from the exhaust system to the intake via rotating the engine in reverse unfueled via the motor at a predetermined engine speed. A second example of the system optionally includes the first example, and further comprises a turbine positioned in the exhaust system, the turbine mechanically coupled to a compressor positioned in the intake; an electric booster positioned in the intake downstream of the compressor; an exhaust gas recirculation passage for recirculation of exhaust gas to the intake, the exhaust gas recirculation passage including an exhaust gas recirculation valve; a wastegate passage in parallel with the turbine, the wastegate passage including a wastegate valve; and wherein the controller stores further instructions to route the first air flow and the second air flow from the exhaust system to the intake via activating the electric booster in reverse via the motor and maintaining the engine stopped from rotating, and via commanding open the wastegate valve and the exhaust gas recirculation valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
diagnosing an electric heater configured to increase a temperature of an exhaust catalyst positioned in an exhaust system of an engine of a vehicle by activating the electric heater, routing air flow from the exhaust system to an intake of the engine, and indicating the electric heater is degraded based on a test temperature in the intake being below a threshold temperature.

2. The method of claim 1, further comprising routing air flow from the exhaust system to the intake of the engine without activating the electric heater prior to activating the electric heater, to obtain a baseline temperature in the intake of the engine, and where the threshold temperature is a predetermined amount greater than the baseline temperature.

3. The method of claim 2, wherein obtaining the baseline temperature and the test temperature is via an intake air temperature sensor.

4. The method of claim 2, wherein diagnosing the electric heater includes sealing an evaporative emissions system from the intake of the engine, the evaporative emissions system configured to trap and store fuel vapors from a fuel system of the vehicle.

5. The method of claim 2, wherein the vehicle comprises a vehicle operated via a vehicle operator, or where the vehicle comprises an autonomous vehicle; and
wherein diagnosing the electric heater includes conditions where the vehicle is unoccupied.

6. The method of claim 2, wherein the engine is equipped with a start/stop feature that automatically stops the engine in response to a set of predetermined conditions being met while the engine is combusting air and fuel; and
wherein under conditions where the electric heater is indicated to be degraded, updating the start/stop feature to prevent the engine from stopping at start/stop events where it is predicted that the temperature of the exhaust catalyst will drop below a threshold exhaust catalyst temperature during the start/stop event.

7. The method of claim 2, further comprising:
under conditions where the engine includes an electric booster positioned in the intake of the engine, routing air flow from the exhaust system to the intake via activating the electric booster in a reverse orientation to apply negative pressure with respect to atmospheric pressure on the exhaust system.

8. The method of claim 7, further comprising, under conditions where the engine does not include the electric booster, or where the electric booster is indicated to be degraded, routing air flow from the exhaust system to the intake via rotating the engine unfueled in reverse to apply negative pressure with respect to atmospheric pressure on the exhaust system.

9. The method of claim 8, further comprising commanding fully open a throttle positioned in the intake in order to route air flow from the exhaust system to the intake of the engine, under conditions where routing air flow is via rotating the engine unfueled in reverse or via activating the electric booster in the reverse orientation.

10. The method of claim 7, wherein routing air flow from the exhaust system to the intake via activating the electric booster in reverse further comprises commanding open an exhaust gas recirculation valve positioned in an exhaust gas recirculation passage;
commanding open a wastegate valve positioned in a wastegate passage, the wastegate passage configured to bypass a turbine positioned in the exhaust system; and
commanding closed an electric booster bypass valve configured in parallel with the electric booster, and further configured to enable air flow to bypass the electric booster when the electric bypass valve is commanded open.

11. The method of claim 10, wherein routing air flow from the exhaust system to the intake via activating the electric booster in reverse further comprises:
sealing all cylinders of the engine via commanding closed intake and exhaust valves coupled to all cylinders of the engine.

12. A method comprising:
diagnosing an electric heater coupled to an exhaust catalyst positioned in an exhaust system of an engine of a vehicle via obtaining a baseline temperature in an intake of the engine under conditions where an air flow is routed from the exhaust system to the intake without activation of the electric heater and then subsequently obtaining a test temperature of the intake of the engine under conditions where the air flow is routed from the exhaust system to the intake with activation of the electric heater, where diagnosing the electric heater includes indicating the electric heater is functioning as desired in response to the test temperature being greater than a threshold temperature.

13. The method of claim 12, wherein the threshold temperature is set a predetermined amount greater than the baseline temperature; and
wherein the predetermined amount greater than the baseline temperature is a function of an output of the electric heater when activated.

14. The method of claim 12, further comprising:
in a first condition, operating the vehicle in a first mode where routing the air flow from the exhaust system to the intake is via an electric booster positioned in the intake of the engine and where the electric booster is controlled to operate in a reverse orientation; and
in a second condition, operating the vehicle in a second mode where routing the air flow from the exhaust system to the intake is via rotating the engine unfueled in reverse.

15. The method of claim 14, further comprising operating the vehicle in the first mode under conditions where the vehicle includes an electric booster, or under conditions where the vehicle includes an electric booster and the state of charge of an on-board battery is below a threshold, and operating the vehicle in the second mode under conditions where the vehicle is not equipped with the electric booster, or under conditions where the electric booster is indicated to be degraded.

16. The method of claim 14, wherein operating the vehicle in both the first mode and the second mode includes commanding fully open a throttle positioned in the intake of the engine, the throttle positioned downstream of the electric booster under conditions where the vehicle includes the electric booster.

17. The method of claim 14, wherein routing the air flow from the exhaust system to the intake in the first mode includes routing the air flow such that the air flow bypasses a turbine positioned in the exhaust system and additionally bypasses the engine; and
wherein routing the air flow from the exhaust system to the intake in the second mode includes routing the air flow through the engine.

18. A system for a hybrid vehicle, comprising:
an engine including an intake and an exhaust system;
an exhaust catalyst positioned in the exhaust system;
an electric heater configured to heat the exhaust catalyst;
an intake air temperature sensor positioned in the intake;
a throttle positioned in the intake; and
a controller storing instructions in non-transitory memory, that when executed, cause the controller to:
command fully open the throttle;
obtain a baseline intake air temperature via the intake air temperature sensor while routing a first air flow from the exhaust system to the intake without activating the electric heater;
obtain a test intake air temperature while routing a second air flow from the exhaust system to the intake with the electric heater activated; and
indicate the electric heater is degraded in response to the test intake air temperature being below a threshold intake air temperature, the threshold intake air temperature set a predetermined amount greater than the baseline intake temperature.

19. The system of claim 18, further comprising a motor; and
  wherein the controller stores further instructions to route the first air flow and the second air flow from the exhaust system to the intake via rotating the engine in reverse unfueled via the motor at a predetermined engine speed.

20. The system of claim 19, further comprising:
  a turbine positioned in the exhaust system, the turbine mechanically coupled to a compressor positioned in the intake;
  an electric booster positioned in the intake downstream of the compressor;
  an exhaust gas recirculation passage for recirculation of exhaust gas to the intake, the exhaust gas recirculation passage including an exhaust gas recirculation valve;
  a wastegate passage in parallel with the turbine, the wastegate passage including a wastegate valve; and
  wherein the controller stores further instructions to route the first air flow and the second air flow from the exhaust system to the intake via activating the electric booster in reverse via the motor and maintaining the engine stopped from rotating, and via commanding open the wastegate valve and the exhaust gas recirculation valve.

\* \* \* \* \*